United States Patent
Le

(10) Patent No.: US 8,137,570 B2
(45) Date of Patent: *Mar. 20, 2012

(54) ADDITIVE WRITE POLE PROCESS FOR WRAP AROUND SHIELD

(75) Inventor: Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 728 days.

This patent is subject to a terminal disclaimer.

(21) Appl. No.: 12/100,284

(22) Filed: Apr. 9, 2008

(65) Prior Publication Data

US 2009/0255899 A1    Oct. 15, 2009

(51) Int. Cl.
   *G11B 5/127* (2006.01)
   *B44C 1/22* (2006.01)

(52) U.S. Cl. ............ 216/22; 29/603.13; 29/603.15; 29/603.16; 29/603.18; 216/66

(58) Field of Classification Search ............ 216/22; 29/603.16, 603.18, 603.31, 603.15; 438/692
See application file for complete search history.

(56) References Cited

U.S. PATENT DOCUMENTS

| | | | |
|---|---|---|---|
| 7,120,988 B2 | 10/2006 | Le et al. | 29/603.07 |
| 7,139,153 B2 | 11/2006 | Hsiao et al. | 360/126 |
| 7,239,478 B1 | 7/2007 | Sin et al. | 360/126 |
| 7,248,431 B1 * | 7/2007 | Liu et al. | 360/119.02 |
| 7,467,461 B2 * | 12/2008 | Bonhote et al. | 29/603.16 |
| 7,648,731 B2 * | 1/2010 | Guthrie et al. | 427/131 |
| 2005/0037607 A1 * | 2/2005 | Sato | 438/631 |
| 2005/0066517 A1 | 3/2005 | Bedell et al. | 29/603.13 |
| 2005/0102821 A1 * | 5/2005 | Kagami et al. | 29/603.12 |
| 2006/0044681 A1 * | 3/2006 | Le et al. | 360/126 |
| 2006/0090329 A1 | 5/2006 | Kato et al. | 29/603.01 |
| 2006/0174474 A1 * | 8/2006 | Le | 29/603.12 |
| 2007/0026537 A1 * | 2/2007 | Jiang et al. | 438/3 |
| 2007/0115583 A1 | 5/2007 | Bonhote et al. | 360/126 |
| 2007/0115584 A1 | 5/2007 | Balamane et al. | 360/126 |
| 2007/0183093 A1 | 8/2007 | Le et al. | 360/126 |

(Continued)

FOREIGN PATENT DOCUMENTS

JP    2006147023    6/2006

(Continued)

OTHER PUBLICATIONS

Okada et al., "Fabricating Narrow and Trapezoidal Main Poles For Single-Pole-Type Heads" IEEE Transactions on Magnetics, vol. 40, No. 4, Jul. 2004.

(Continued)

*Primary Examiner* — Lan Vinh
*Assistant Examiner* — David Kaufman
(74) *Attorney, Agent, or Firm* — Zilka-Kotab, PC

(57) ABSTRACT

A method for manufacturing a magnetic write head having a wrap around magnetic trailing shield and a very narrow track width. A magnetic write pole is formed by forming a mask over a magnetic write pole material and performing a first ion milling to define the write pole. The mask includes a hard mask layer such as diamond like carbon (DLC) and further mask layers formed over the hard mask layer. In order to facilitate manufacture at very narrow track widths processes are employed to remove re-deposited material and the remaining portions of the mask structure (except the hard mask). Further processing can then be employed without the risk of a very narrow mask structure and redep bending or breaking during later manufacturing steps.

16 Claims, 27 Drawing Sheets

U.S. PATENT DOCUMENTS

2007/0186409 A1* 8/2007 Etoh et al. .................. 29/603.01
2007/0211384 A1* 9/2007 Hsiao et al. ................... 360/126
2007/0245545 A1* 10/2007 Pentek et al. .............. 29/603.13

FOREIGN PATENT DOCUMENTS

JP 2007035165 2/2007

OTHER PUBLICATIONS

Okada et al., "Newly Developed Wraparound-Shielded Head for Perpendicular Recording" IEEE Transactions on Magnetics, vol. 41, No. 10, Oct. 2005.

* cited by examiner

ADDITIVE WRITE POLE PROCESS FOR WRAP AROUND SHIELD

RELATED INVENTIONS

This is related to commonly assigned U.S. patent application Ser. No. 11/688,310, filed Mar. 20, 2007 entitled ADDITIVE GAP PROCESS TO DEFINE TRAILING AND SIDE SHIELD GAP FOR A PERPENDICULAR WRITE HEAD, which is incorporated herein by reference as if fully set forth herein.

FIELD OF THE INVENTION

The present invention relates to perpendicular magnetic recording and more particularly to a method for manufacturing a perpendicular magnetic write head with a wrap around trailing magnetic shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head having a wrap around magnetic trailing shield and a very narrow track width. A magnetic write pole is formed by forming a mask over a magnetic write pole material and performing a first ion milling to define the write pole. The mask includes a hard mask layer such as diamond like carbon (DLC) and further mask layers formed over the hard mask layer.

In order to facilitate manufacture at very narrow track widths processes are employed to remove redeposited material and the remaining portions of the mask structure (except the hard mask). Further processing can then be employed without the risk of a very narrow mask structure and redep bending or breaking during later manufacturing steps. The redep can be removed by a basic solution such as potassium hydroxide (KOH) and the mask structure formed over the hard mask can be removed by a process such as hot n-methylpyrrolidone (NMP). An ash step such as using a $H_2$ or $O_2$ gas can be performed prior to the application of KOH. Also A TMAH etch can be performed in lieu of KOH to remove the redep.

After the redep and excess mask structure have been removed, a non-magnetic material such as alumina can be deposited to provide material for non-magnetic side gap layers. At write pole dimensions greater than 85 nm, a second ion milling can be performed to lower the floor of the substrate on which the write pole is formed, define the non-magnetic side gap layers, and remove the non-magnetic side gap layers and residual mask structure and redep on top of the write pole to expose the hard mask. At write pole dimension less than 85 nm, a sacrificial layer such as $SiO_2$ or SiON can be deposited. A chemical mechanical polishing process can then be performed sufficiently to remove the mask structure and redep that is difficult to remove and to expose the hard mask. A reactive ion etching can also be performed to remove the sacrificial fill layer. This may be the same or separate reactive ion etchings.

After the mask structure and redep are removed and the hard mask is exposed, a reactive ion etching can be performed to remove the hard mask. A non-magnetic, electrically conductive seed layer can then be deposited to a thickness to define trailing gap, and a magnetic material can be electroplated to form a wrap around trailing shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
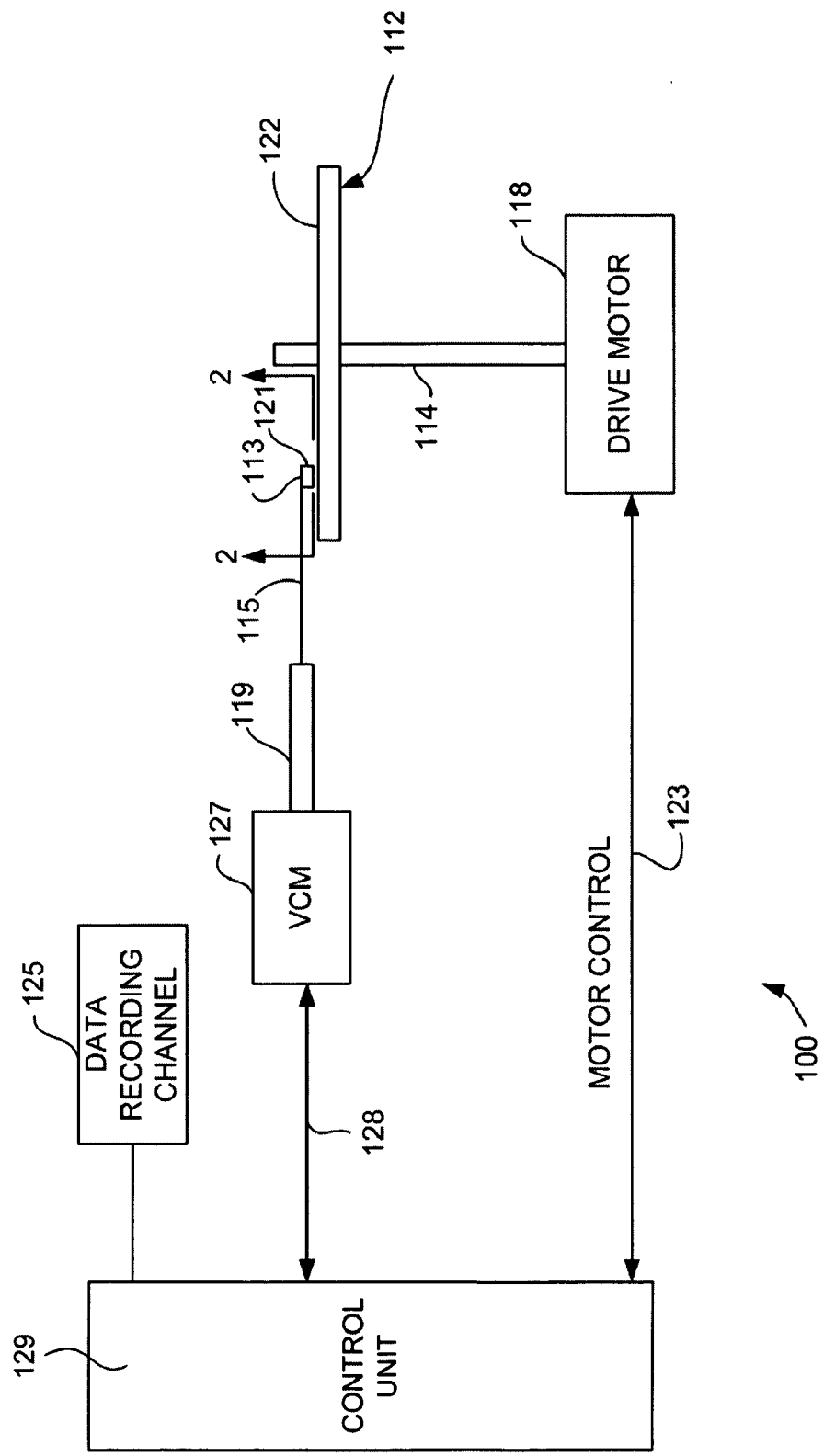
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
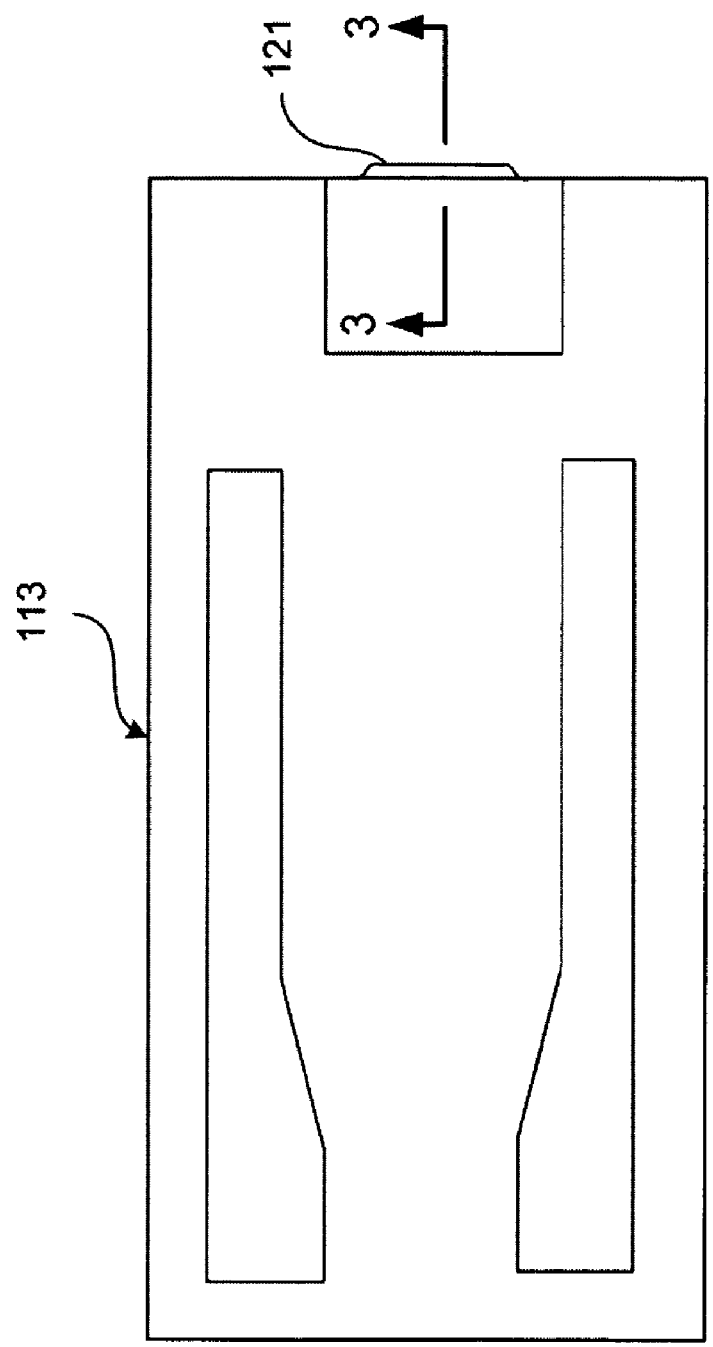
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen, the magnetic head including an inductive write head and a read sensor is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
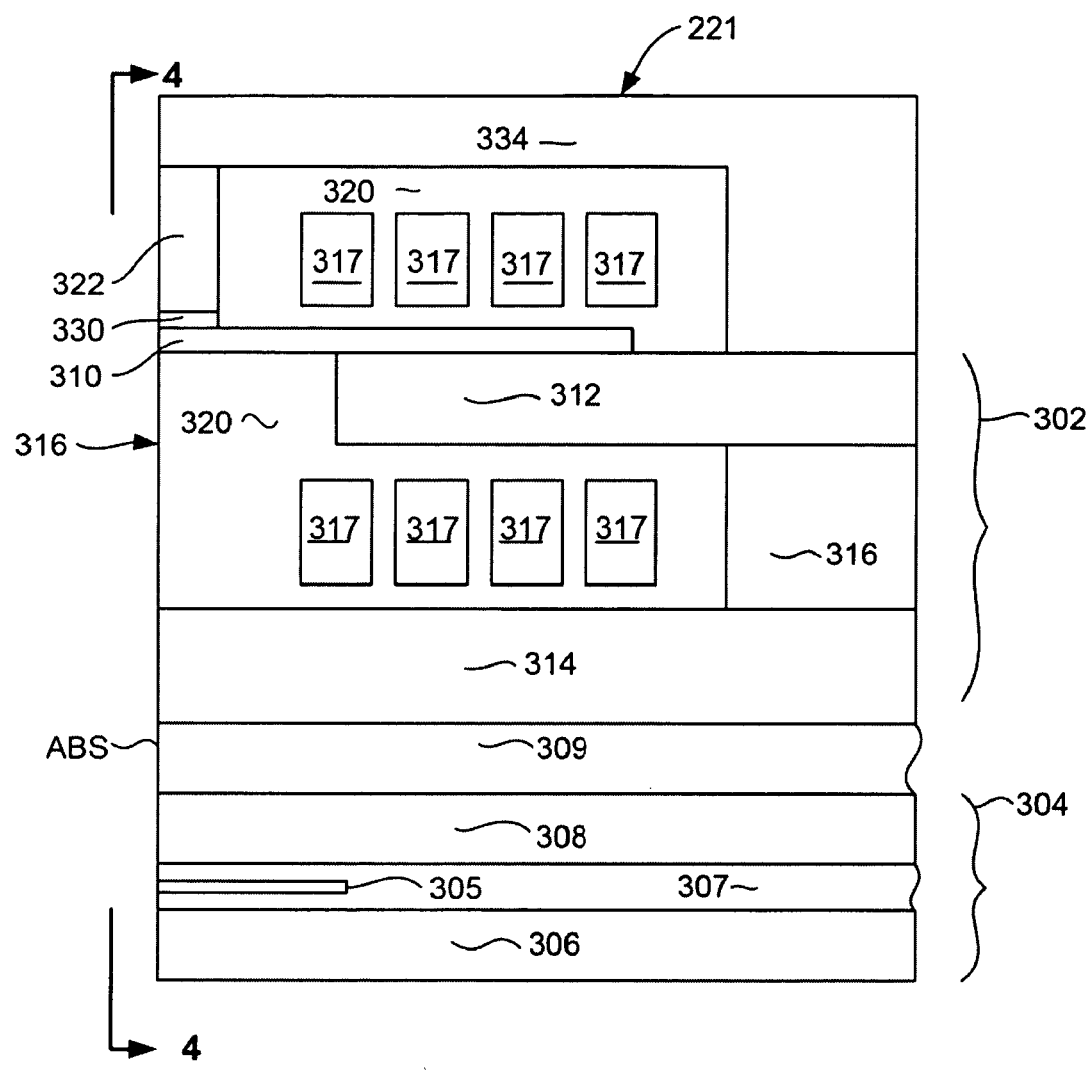
FIG. 3 is a cross sectional view, taken from line 3-3 of FIG. 2 and rotated 90 degrees counterclockwise, of a magnetic head according to an embodiment of the present invention.

With reference now to FIG. 3, a magnetic head 121 for use in a perpendicular magnetic recording system is described. The head 121 includes a write element 302 and a read element 304. The read element includes a magnetoresistive sensor 305, such as a current in plane giant magnetoresistive (CIP GMR) sensor. However, the sensor 305 could be another type of sensor such as a current perpendicular to plane (CPP) GMR sensor or a tunnel junction sensor (TMR) or some other type of sensor. The sensor 305 is located between first and second magnetic shields 306, 308 and embedded in a dielectric material 307. The magnetic shields 306, 308, which can be constructed of for example CoFe or NiFe, absorb magnetic fields such as those from up-track or down track data signals, ensuring that the read sensor 304 only detects the desired data bit located between the shields 306, 308. A non-magnetic, electrically insulating gap layer 309 may be provided between the shield 308 and the write head 302.

Figure 4:
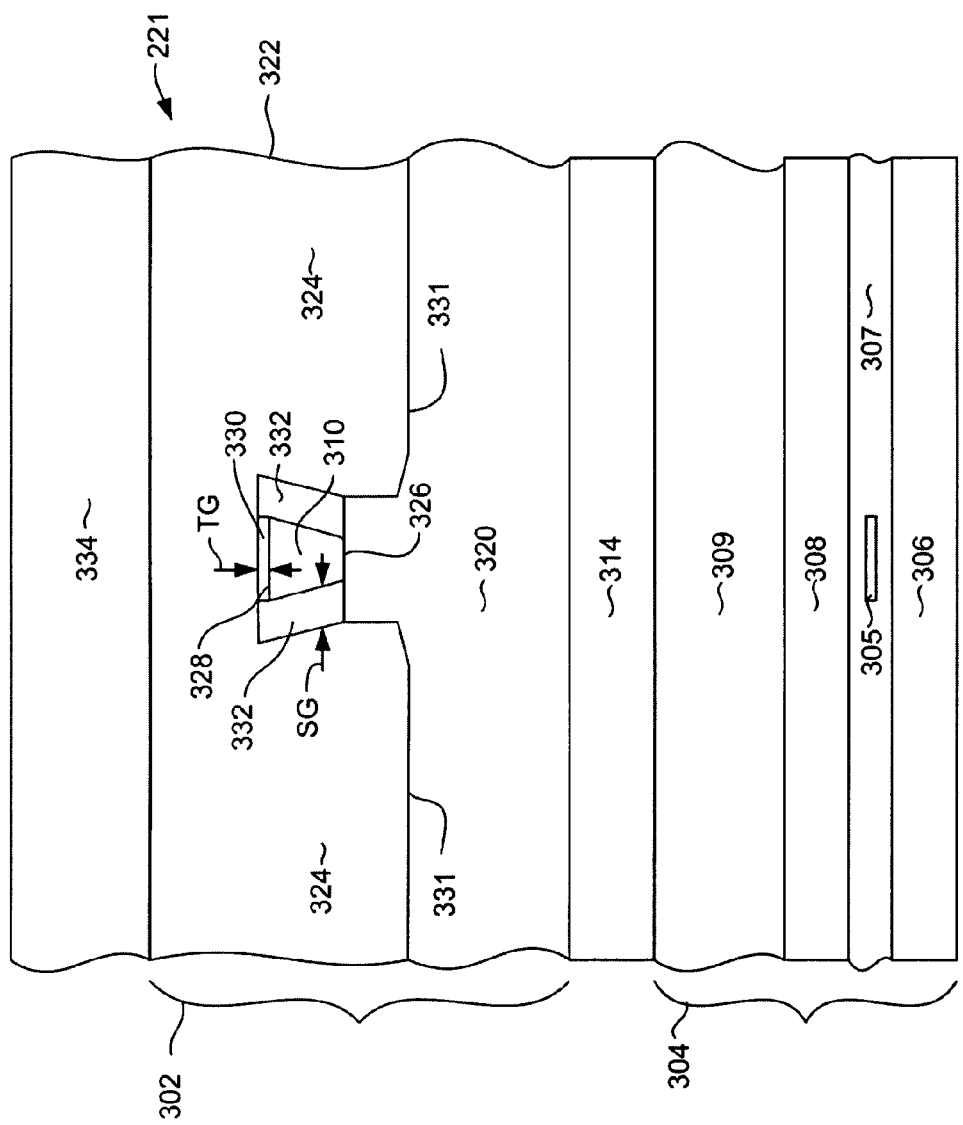
FIG. 4 is an ABS view of the write head taken from line 4-4 of FIG. 3.

With continued reference to FIG. 3, the write element 302 includes a write pole 310 that is magnetically connected with a magnetic shaping layer 312. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a main or leading return pole 314 that has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes above and below the write pole 310. The write coil 317 is surrounded by an electrically insulating material 320 that electrically insulates the turns of the coil 317 from one another and electrically isolates the coil 317 from the surrounding magnetic structures. When a current passes through the coil 317, the resulting magnetic field causes a magnetic flux to flow through the return pole 314, back gap 316, shaping layer 312 and write pole 310. This magnetic flux causes a write field to be emitted toward an adjacent magnetic medium (not shown in FIGS. 3 and 4). The insulation layers 320 can be constructed of a material such as alumina ($Al_2O_3$) or can be constructed as various layers of the same or different electrically insulating, non-magnetic materials.

With reference to FIG. 4, the write head element 302 may also include a trailing shield 322, which can be constructed of a magnetic material such as NiFe or some other material. With reference to FIG. 4, the trailing shield 322 is configured to wrap around the write pole 310 to provide side shielding as well as trailing shielding to prevent data erasure due to stray magnetic fields. These stray magnetic fields can be from the write head 302 itself or could also be from adjacent track signals or from magnetic fields from external sources. The write pole 310 has a leading edge 326 and a trailing edge 328. The terms leading and trailing refer to the direction of travel over the magnetic medium when the write head 221 is in use. Therefore, the trailing shield 322 has side portions 324. These side portions each have a leading edge 331 that extends at least to the leading edge 326 of the write pole 310 and which preferably extend beyond the leading edge 326 of the write pole 310. Extending the side portions 324 to or beyond the leading edge of the write pole, ensures that any side stray fields will be very effectively prevented from affecting the magnetic medium.

As can be seen, the trailing shield 322 is separated from the trailing edge 328 of the write pole 310 by a non-magnetic trailing gap layer 330 having a trailing gap thickness (TG), and is separated from the laterally opposed sides of the write pole by non-magnetic side gap layers 332 each having a side gap thickness (SG). The portion of the trailing shield 322 that is adjacent to the trailing edge 328 of the write pole 310 increases the field gradient of the write head. This is accomplished by drawing the write field toward this trailing portion of the trailing shield 322, which cants the write field a desired amount. Therefore, the write field is not perfectly perpendicular, but is canted somewhat in the trailing direction.

The trailing gap thickness TG involves a tradeoff. If the trailing gap TG is too large, field gradient will not be large enough. If the trailing shield gap TG is too small, an unacceptable amount of write field will be lost to the trailing shield, resulting in a weak write field. Therefore, the thickness of the trailing gap TG should be somewhat tightly controlled. The thickness of the side gaps SG is, however, not as critical. The side gaps SG are preferably larger than the trailing gap TG.

With reference still to FIG. 4, the write pole 310 preferably has a trapezoidal shape as viewed from the ABS. This trapezoidal shape, wherein the write pole 310 is narrower at the leading edge 326 than at the trailing edge prevents skew related adjacent track interference when the write head is located at inner and outer portions of magnetic disk (FIG. 1).

With reference to FIGS. 5-15 a method for constructing a write head for perpendicular magnetic recording is described. The method allows the trailing shield to be formed so that it can extend to or beyond the leading edge of the write pole, thereby ensuring complete protection against side stray field writing.

A trailing magnetic return pole can be provided to connect the trailing shield 322 with the back magnetic portions of the write head 302, such as the back of the shaping layer 312 and back gap 316. This trailing return pole 334 prevents magnetic saturation of the trailing shield 322 and also provides an addition magnetic flux return path.

Figure 5:
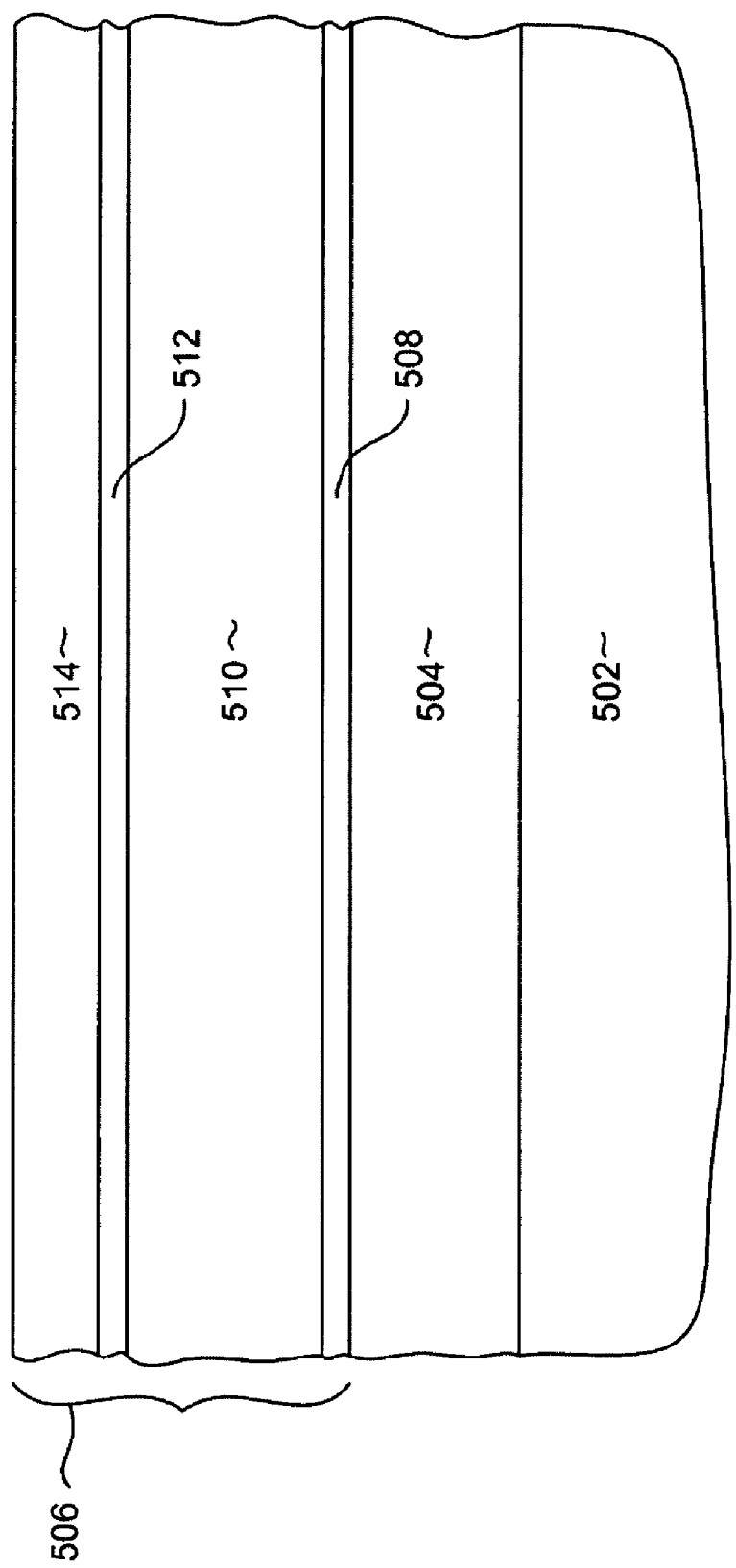
FIGS. 5-18 are views of a write head in various intermediate stages of manufacture illustrating a method of manufacturing a write head according to a possible embodiment of the invention.

A method for manufacturing a magnetic write such as a write head 302 described above with reference to FIGS. 3 and 4 and having a very narrow track width is described with reference to FIGS. 5-18. With particular reference to FIG. 5, a substrate 502 is provided. This substrate 502 can be constructed of alumina ($Al_2O_3$), and can also include at least a portion of the shaping layer 312. The substrate 502 can be formed with the shaping layer 312 (deposited or electroplated during a shaping layer fill process and planarized by chemical mechanical polishing (CMP) to expose the top surface of the magnetic shaping layer 312).

A magnetic write pole material 504 is deposited over the substrate 502. While various magnetic materials can be used for the write pole material 504, such as NiFe, CoFe, etc., the write pole material 504 is preferably deposited as a lamination of magnetic layers such as NiFe or CoFe separated by thin layers of non-magnetic material such as alumina ($Al_2O_3$) or some other non-magnetic material.

A series of one more mask layers 506 are deposited over the magnetic write pole material 504. The mask 506 may be one of many possible structures, but preferably includes a first or bottom hard mask 508, an image transfer layer 510, a second hard mask layer 512, and a resist layer 514 such as photoresist or thermal image resist. The first hard mask layer 508 is preferably constructed of a material that is resistant to CMP and also to ion milling. The first hard mask layer is, therefore, preferably constructed of diamond like carbon (DLC). The image transfer layer 510 can be constructed of a soluble polyimide material such as DURAMIDE®. The second hard mask layer 512 can be constructed of a material such as $SiO_2$.

Figure 6:
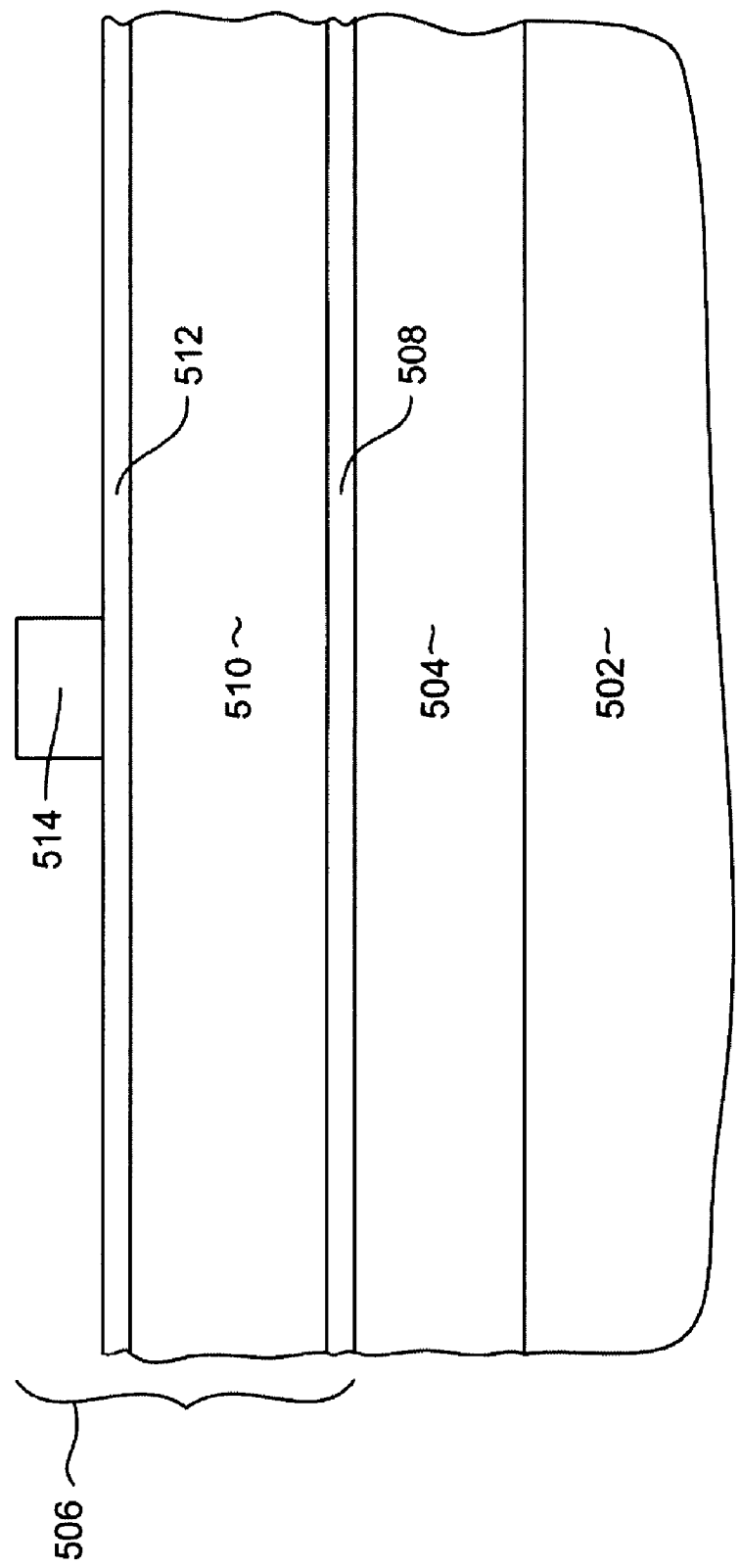
Figure 7:
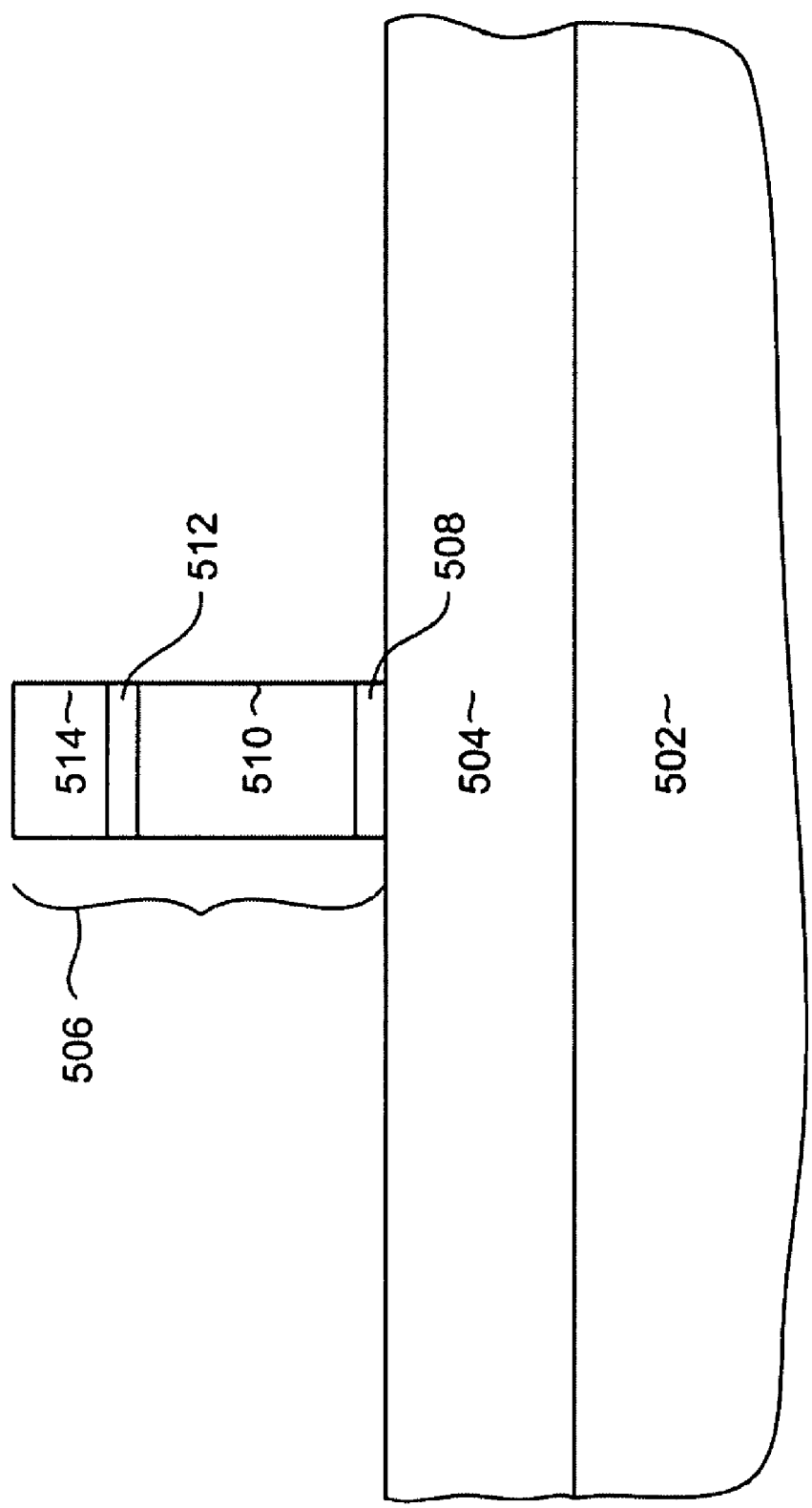

With reference now to FIG. 6, the resist layer is patterned to have a width to define a track width of the write pole 310 (FIG. 4). The resist layer 514 can be patterned by photolithographic processes that may include photolithographic imaging and developing. Then, with reference to FIG. 7, one or more material removal processes such as reactive ion etching (RIE) can be performed to transfer the pattern of the resist layer 514 onto the underlying image transfer layer 512, 510 and hard mask 508.

Figure 8:
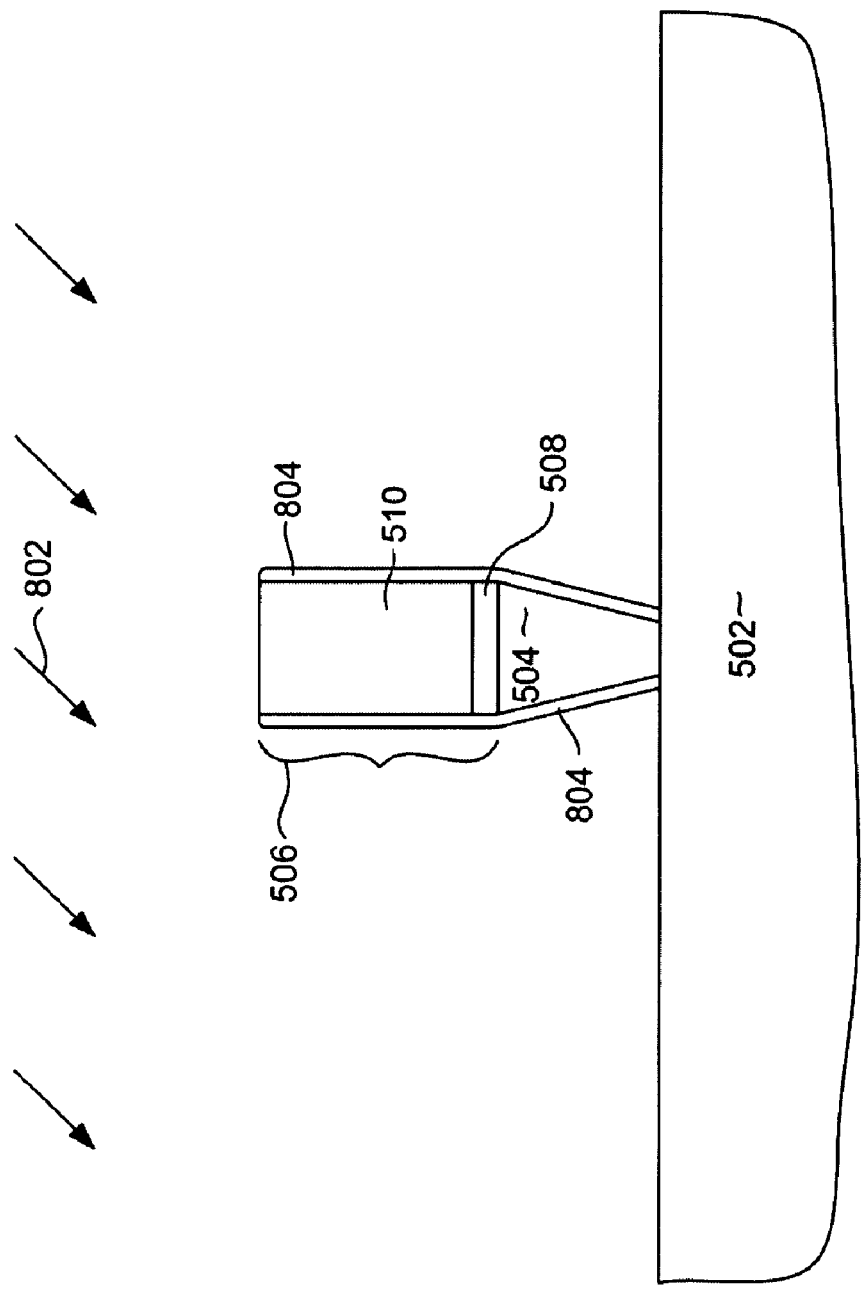

Then, with reference to FIG. 8, an ion milling process is performed to remove portions of the write pole material 504 that are not protected by the mask 506. The first hard mask is resistant to ion milling and, therefore, allows the write pole 504 to be formed with a well controlled width (trailing edge). The ion milling can be performed by directing an ion beam 802 at one or more angles relative to normal in order to form the write pole 504 with a trapezoidal shape as shown. The ion milling can be performed until the underlying substrate 502 has been reached.

Figure 9:
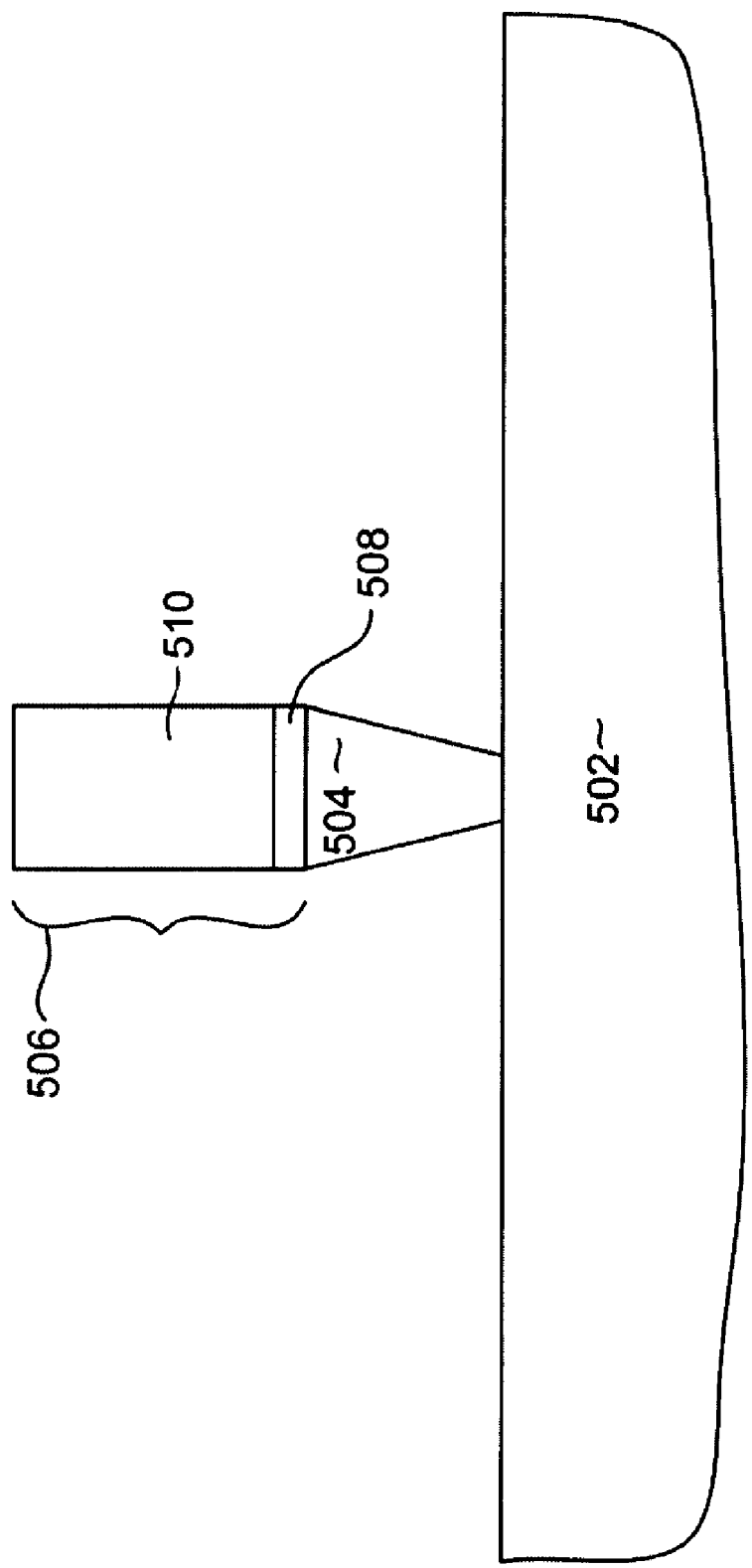

In order to form a write pole 504 with a desired narrow track width, it is necessary for the mask 506 to have a very high aspect ratio. In other words, the mask 506 must be very narrow and tall. This high aspect ratio, however, can cause problems during subsequent manufacturing. Because of the high aspect ratio, the mask would tend to bend or fall over, interfering with subsequent manufacturing. Therefore, as an aspect of the present invention, the additional mask layers 510 (and above layers 512, 514 (FIG. 7) if they are still present) are removed prior to further processing. In addition, the ion milling process results in re-deposited material (redep) 804 being formed on the sides of the mask layers 506. This redep 804, which is primarily write pole material 504 and alumina re-deposited from the substrate 502, can also cause problems with manufacturing, and therefore is preferably removed prior to further manufacture. To this end, first material removal process such as a basic solution such as KOH wet etch is performed to remove the redep 804, which results in a structure as shown in FIG. 9. An ash step such as using an $O_2$ or $H_2$ gas can be performed prior to KOH. Also, a TMAH etch can be performed in lieu of KOH.

Figure 10:
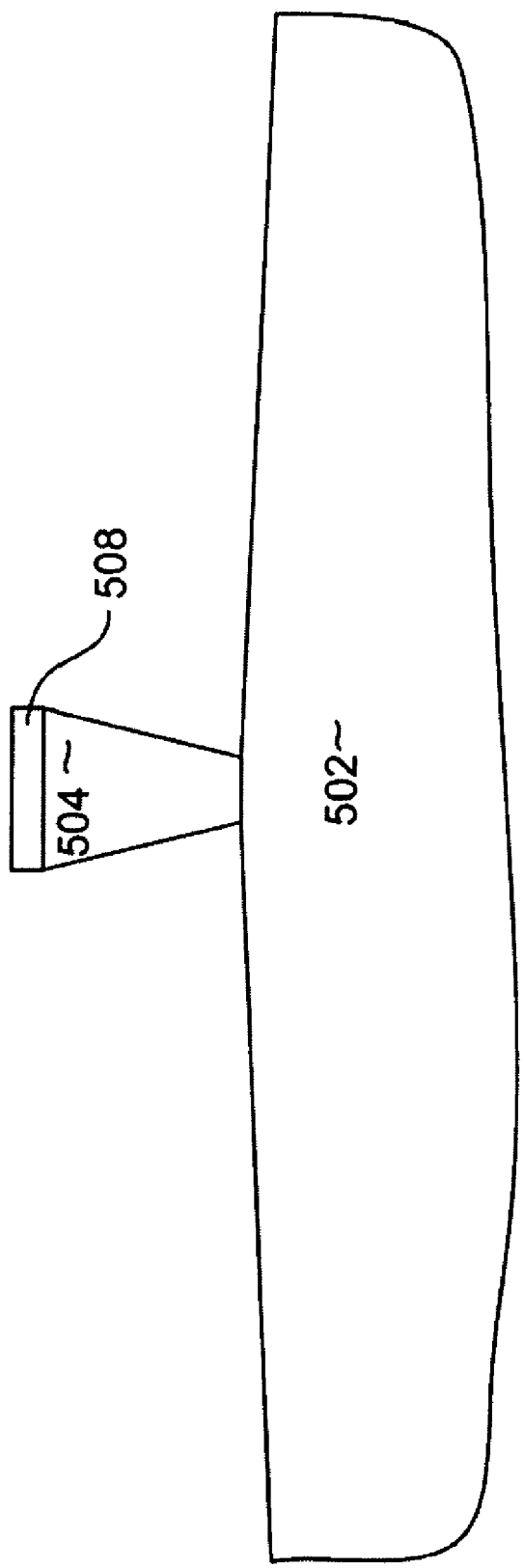

Then, a second material removal process such as hot NMP is performed to remove the remaining mask layer 510, while leaving the layer 508 intact. This results in a structure such as shown in FIG. 10. Although not shown in FIG. 10, there can be residual mask structure and redep. As will be shown later, depending on the write pole dimension, there are ion milling and CMP approaches for removing the residual mask structure and redep.

Figure 11:
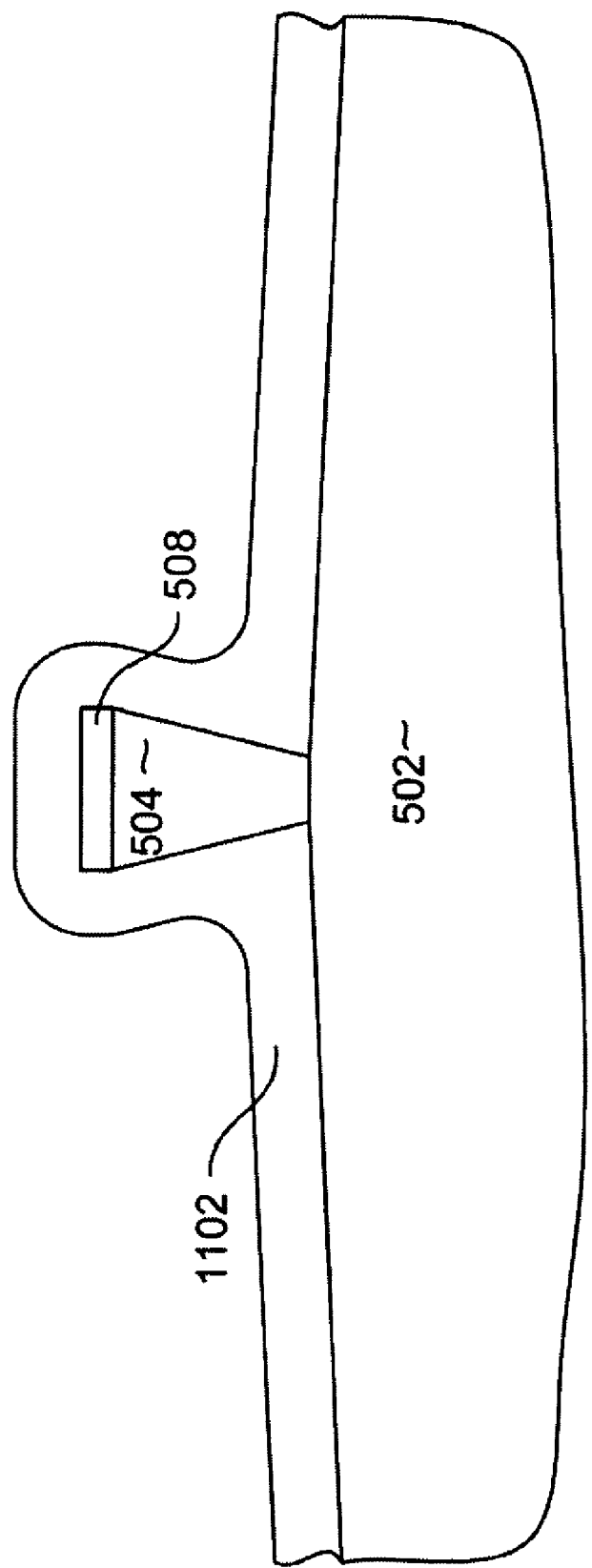
Figure 12:
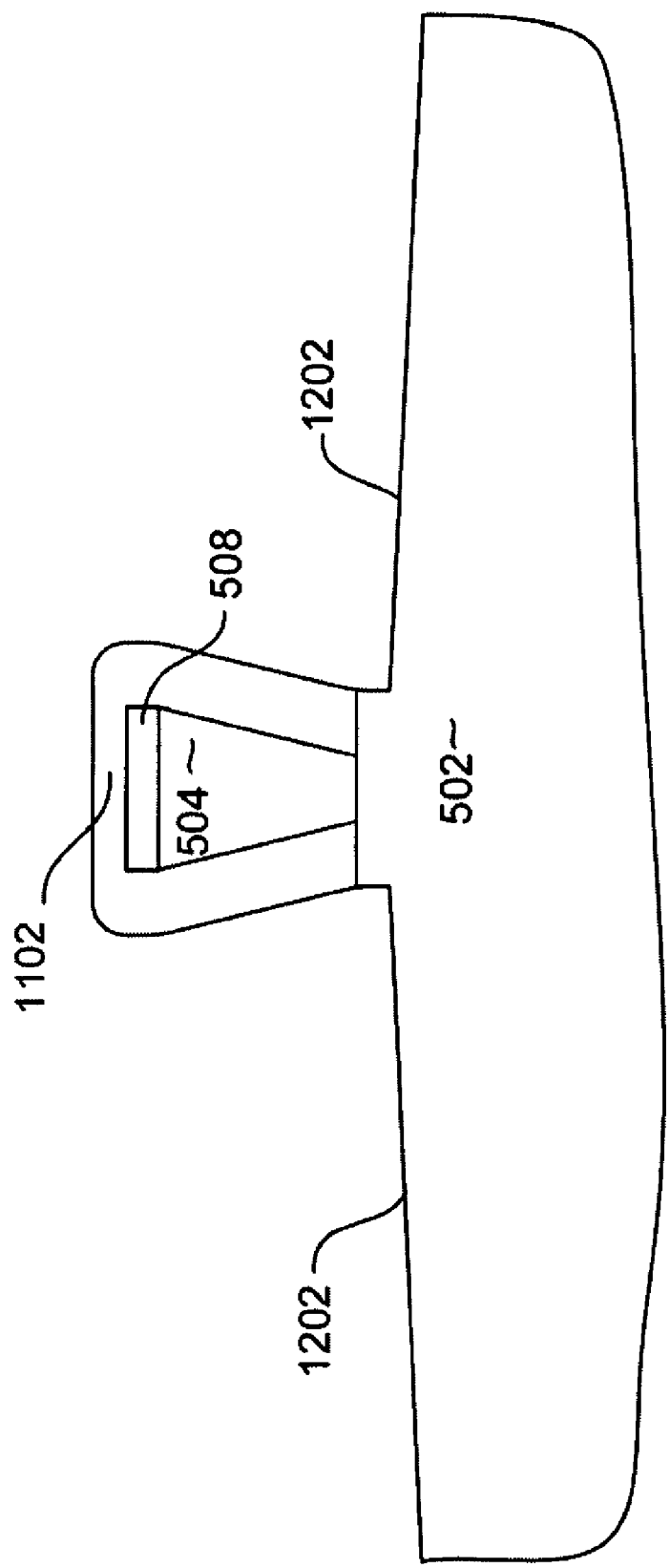

With reference to FIG. 11, a layer of non-magnetic side wall material (first non-magnetic side wall layer) 1102 is conformally deposited. The side wall material 1102 is preferably alumina, deposited by a conformal deposition process such as atomic layer deposition (ALD) or some other conformal process such as chemical vapor deposition (CVD). Therefore, the layer 1102 will be referred to herein as ALD layer 1102. With reference to FIG. 12, an ion milling process is performed. Because ion milling is a directional process, it removes the horizontally disposed portions of the ALD layer 1102 more quickly than the vertical portions. Therefore, the ion milling results in ALD side walls 1102 formed at the sides of the write pole 504. The ion milling is continued after the substrate 502 has been reached in order form a recessed floor 1202 on the substrate. The term "recessed floor", means that the portions of substrate 502 at either side of the write pole 504 are recessed, while the portion of the substrate 502 beneath the write pole 504 forms a raised platform. The presence of the ALD side walls 1102 protect the write pole 504 during this additional ion milling step.

Figure 13:
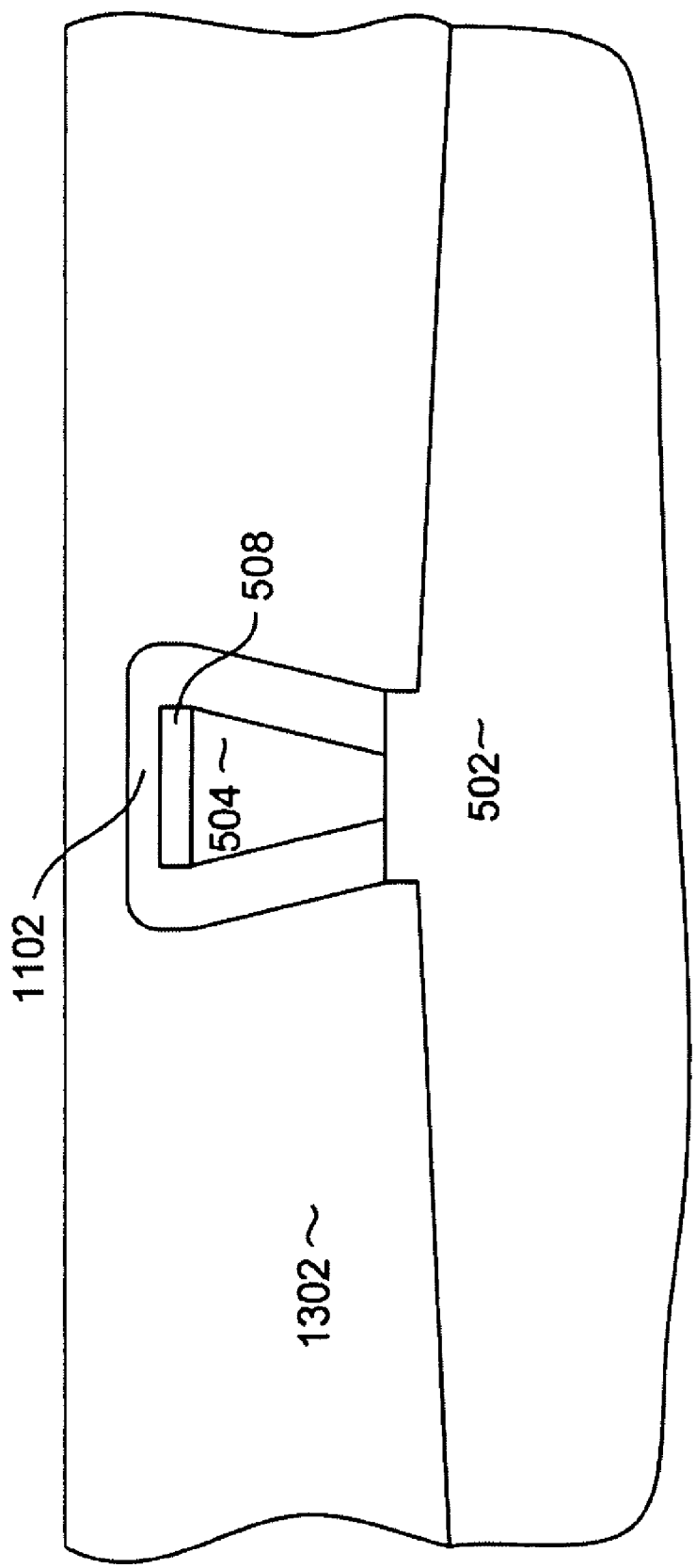

With reference now to FIG. 13, when the write pole dimension is less than 85 nm, a sacrificial CMP fill layer 1302 is deposited. The sacrificial fill layer 1302 is constructed of a material that can be easily removed by a process such as wet etching or reactive ion etching (RIE). For example, the fill layer can be $SiO_2$ or SiON, and is preferably deposited by ion beam deposition. The fill layer 1302 is also preferably deposited to a thickness such that the surface of the fill layer 1302 is above the write pole 504.

Figure 14:
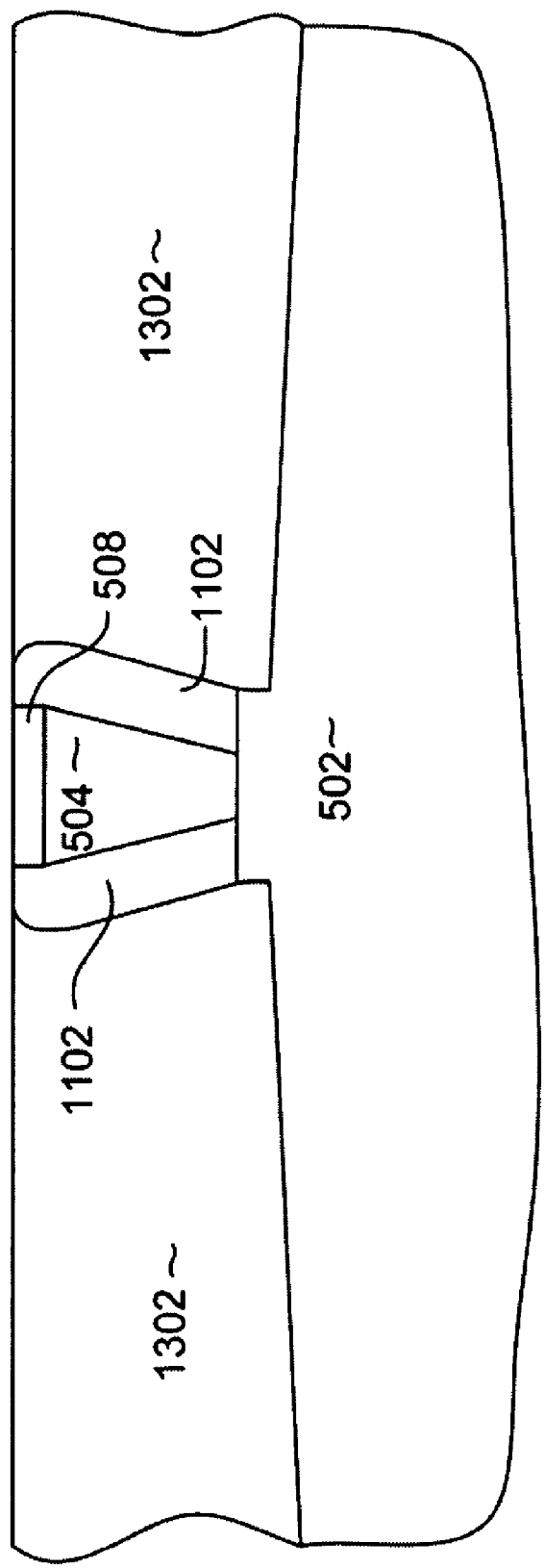

With reference now to FIG. 14, a chemical mechanical polishing (CMP) process is performed until the first hard mask layer 508 is reached. As mentioned above, the first hard mask can be constructed of DLC, which is advantageously very resistant to chemical mechanical polishing (CMP) and is also readily identifiable as a CMP stop, giving a clear visual indication of when CMP should be terminated. The CMP process removes the remaining mask structure 506 and redep, leaving only the hard mask portion 508 behind. The sacrificial fill layer 1302 can be removed by a process such as wet etching or reactive ion etching (RIE). For example, if RIE is used to remove the sacrificial fill layer 1302, the RIE can be performed in a fluorine chemistry such as in a $CF_4$ atmosphere. During the removal of the fill layer 1302, the hard mask 508 (preferably DLC) protects the write pole 504 from being damaged by the fluorine based RIE.

Figure 15:
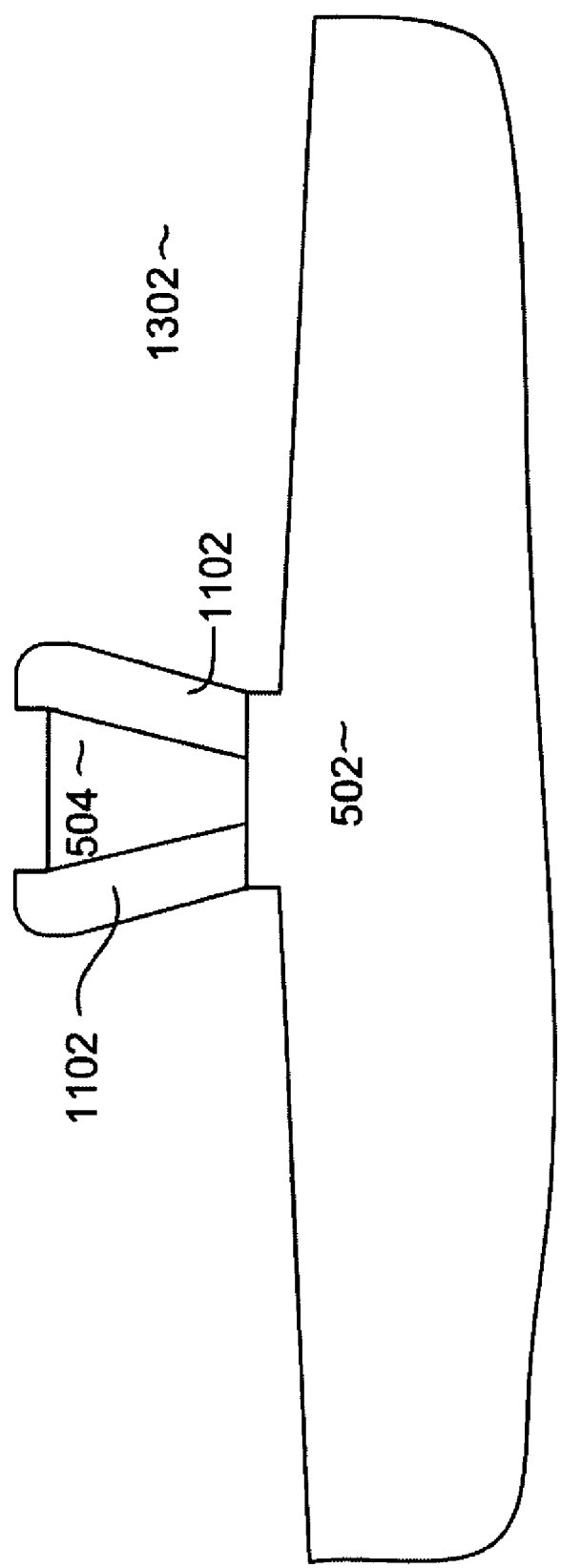

After the fill layer 1302 has been removed, a second RIE can be performed to remove the hard mask 508, resulting in the structure shown in FIG. 15. This second RIE can be performed in an oxygen chemistry such as in an $O_2$ atmosphere. The use of oxygen in this second RIE readily removes the DLC Hard mask 508 without damaging the underlying write pole 504.

Figure 16:
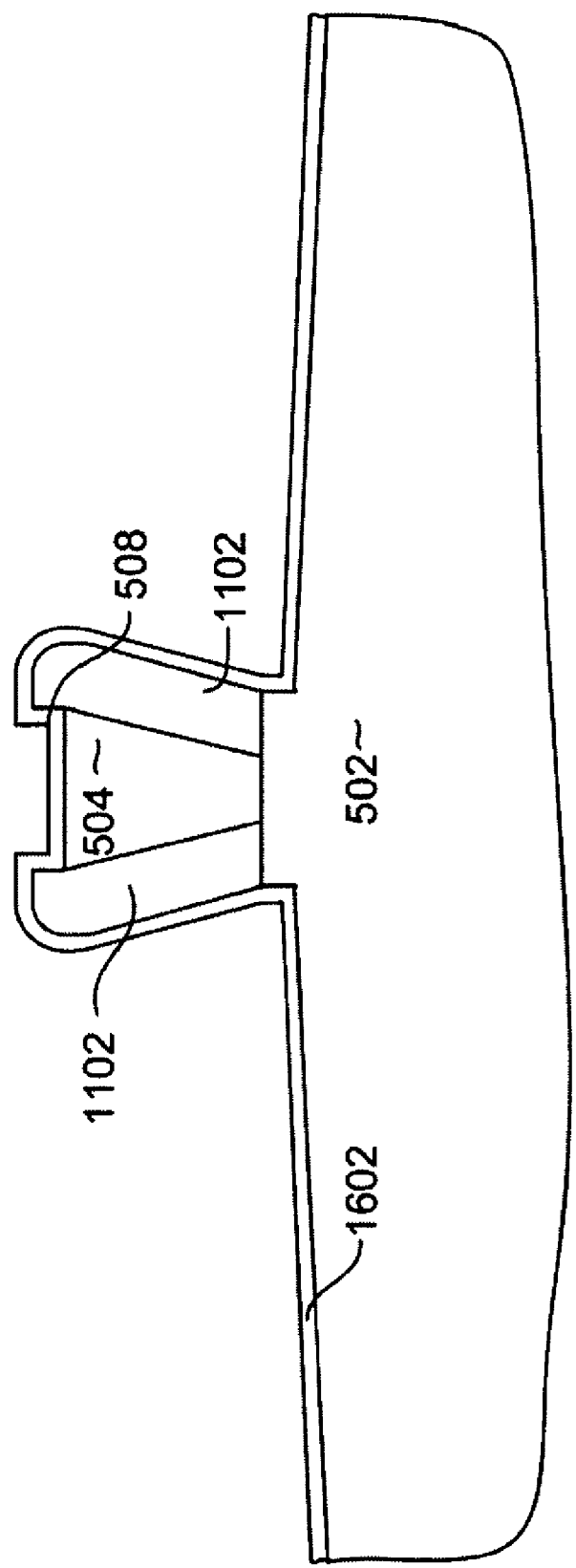

Then, after the hard mask 508 has been removed, a non-magnetic (preferably electrically conductive) material 1602 can be deposited, resulting in a structure as shown on FIG. 16. This non-magnetic, electrically conductive material can be, for example, Rh, Ir or Ta, and is deposited to such a thickness as to define a trailing gap thickness (TG). Note that the combined thicknesses of the non-magnetic layer 1602 plus the non-magnetic layer 1102 define a side gap thickness SG.

Figure 17:
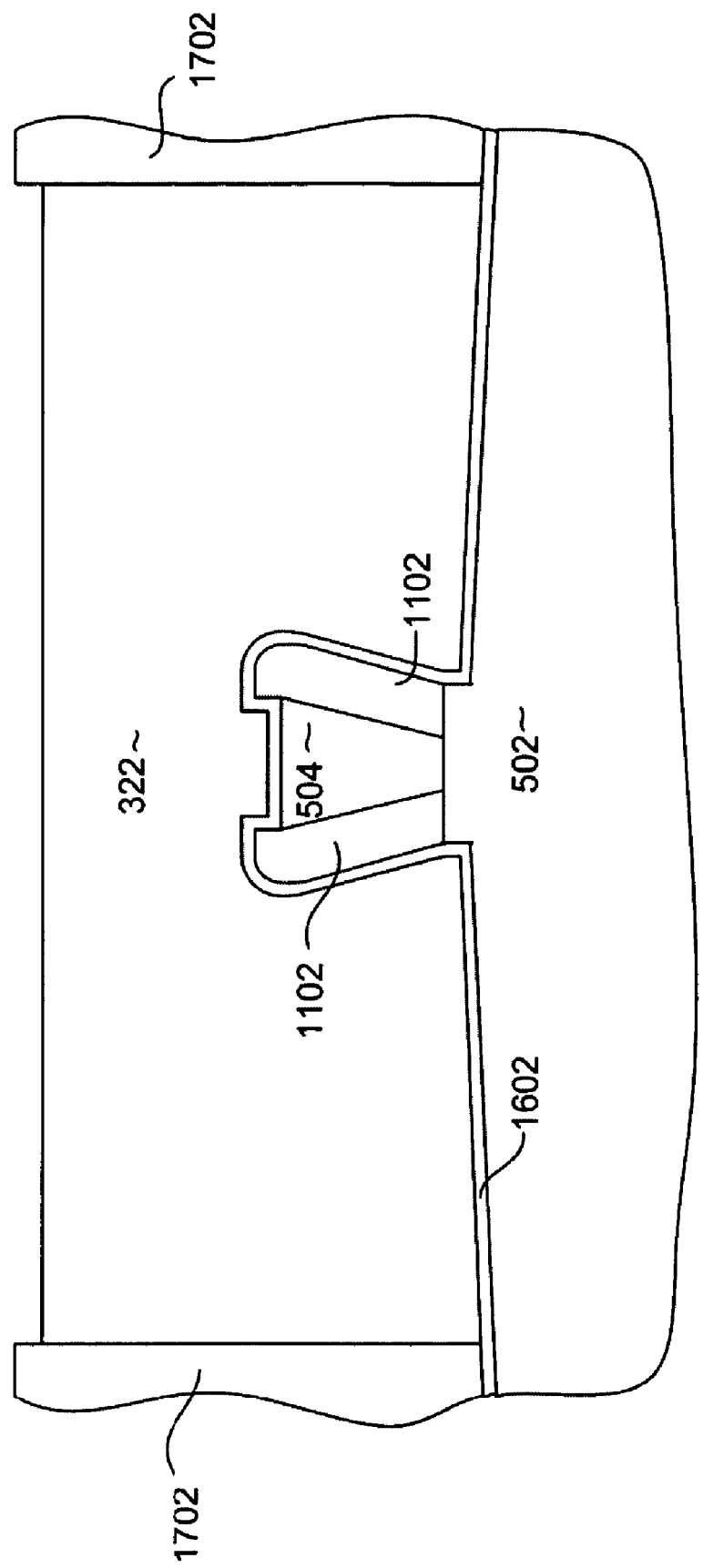
Figure 18:
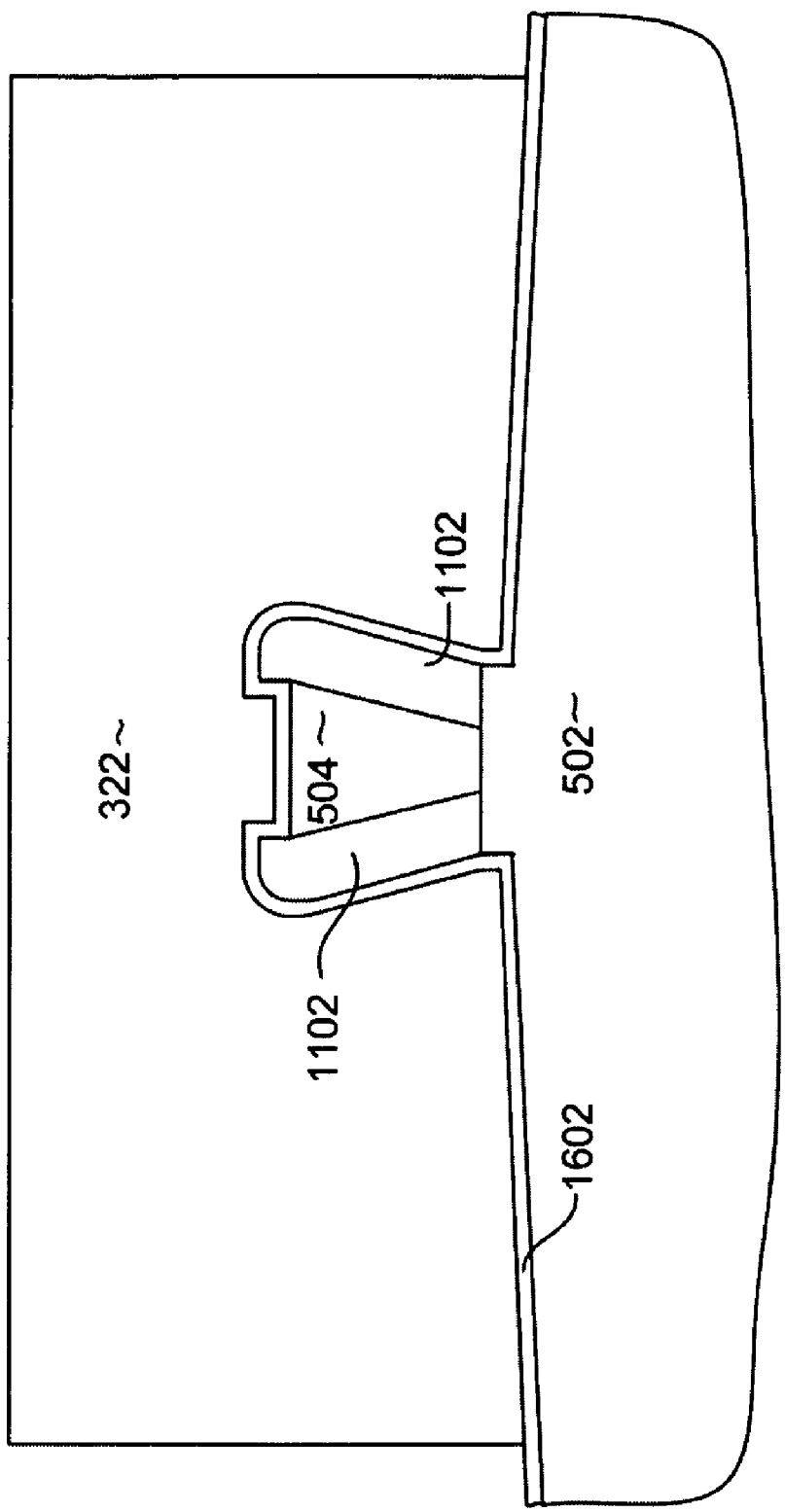

Finally, with reference to FIG. 17, photoresist electroplating frame 1702 is formed having an opening configured to define a trailing shield. Then, a magnetic material such as NiFe or CoFe is electroplated into the opening to form a wrap around trailing magnetic shield 322. The shield 322 advantageously extends below the bottom of the write pole, because of the recession of the floor of the substrate as described above. The electrically conductive, non-magnetic layer 1602 combines with the ALD layer 1102 to define the side gap width SG (FIG. 4), whereas the thickness of the non-magnetic layer 1602 defines the trailing gap thickness TG. In addition, because the non-magnetic layer 1602 is an electrically conductive metal such as Ta and Ir or Rh, it can be used as a seed layer for plating. The photoresist frame 1702 can then be lifted off, leaving a structure as shown in FIG. 18. The rest of the write head such as the upper leads of the 317, and trailing magnetic return pole 334 can then be constructed.

Figure 19:
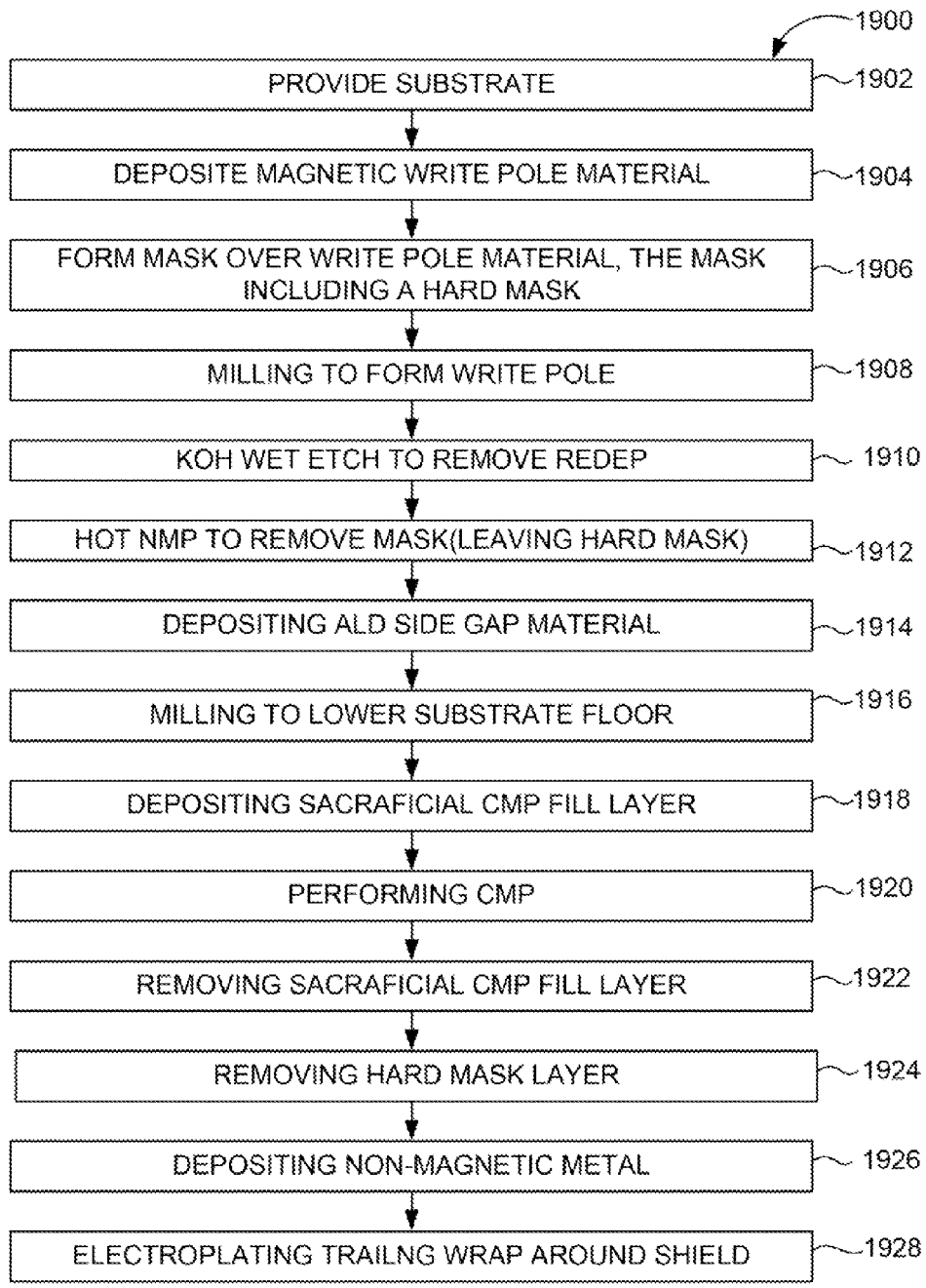
FIG. 19 is a flow chart illustrating a method for manufacturing a magnetic write head according to an embodiment of the invention.

With reference now to FIG. 19, a method 1900 for manufacturing a magnetic write pole and wrap around shield is summarized. In a step 1902, a substrate is provided. As mentioned before, the substrate can be constructed primarily of alumina, and can include a magnetic shaping layer or some other magnetic structure embedded therein. Then, in a step 1904, a magnetic write pole material can be deposited over the substrate. The magnetic write pole material can be a lamination of magnetic layers separated by thin, non-magnetic layers. Then, in a step 1906, a mask structure is formed over the write pole. The mask structure includes a hard mask formed over the write pole material, the hard mask being a material such as diamond like carbon (DLC) that is resistant to chemical mechanical polishing (CMP). Then, in a step 1908, an ion milling process is used to form the write pole. 1910 a KOH wet etch is performed to remove redeposited alumina (redep) from the sides of the mask, and then in a step 1912 a hot NMP process is performed to remove the remaining mask (except the hard mask formed directly on the write pole). In a step 1914, a side gap material (ALD layer) is deposited, which is preferably conformally deposited alumina. Then, in a step 1916 an ion milling process is used to remove horizontally disposed portions of the side gap layer, thereby forming alumina side walls, and is further performed to remove portions of the substrate that are not protected by the write pole and ALD side walls, thereby lowering the substrate floor. It should be pointed out also, that the order of steps 1916 and 1914 could be reversed so that the second ion milling lowers the substrate floor before the non-magnetic side gap material is deposited.

A sacrificial fill layer is then deposited in a step 1918. The sacrificial fill layer can be a material such as $SiO_2$ or SiON that can be readily removed without damaging other structures. Then, in a step 1920 a chemical mechanical polishing process is performed to remove the remaining mask structure except for the hard mask, which is used as a CMP stop layer. In a step 1922 the sacrificial fill layer is removed by a process such as wet etching or reactive ion etching (RIE). In a step, 1924, the hard mask is removed, such as by a RIE performed in an oxygen atmosphere. Then, in a step 1926 a non-magnetic metal is deposited. The non-magnetic metal, such as Ta, Ir or Rh is deposited to a thickness to define the trailing gap and to such a thickness that the combined thicknesses of the ALD walls and the non-magnetic metal together define the side gap. Then, in a step 1928, a magnetic material, such as NiFe is deposited to form a wrap around trailing shield, using the non-magnetic metal as an electrically conductive seed for electroplating.

Figure 20:
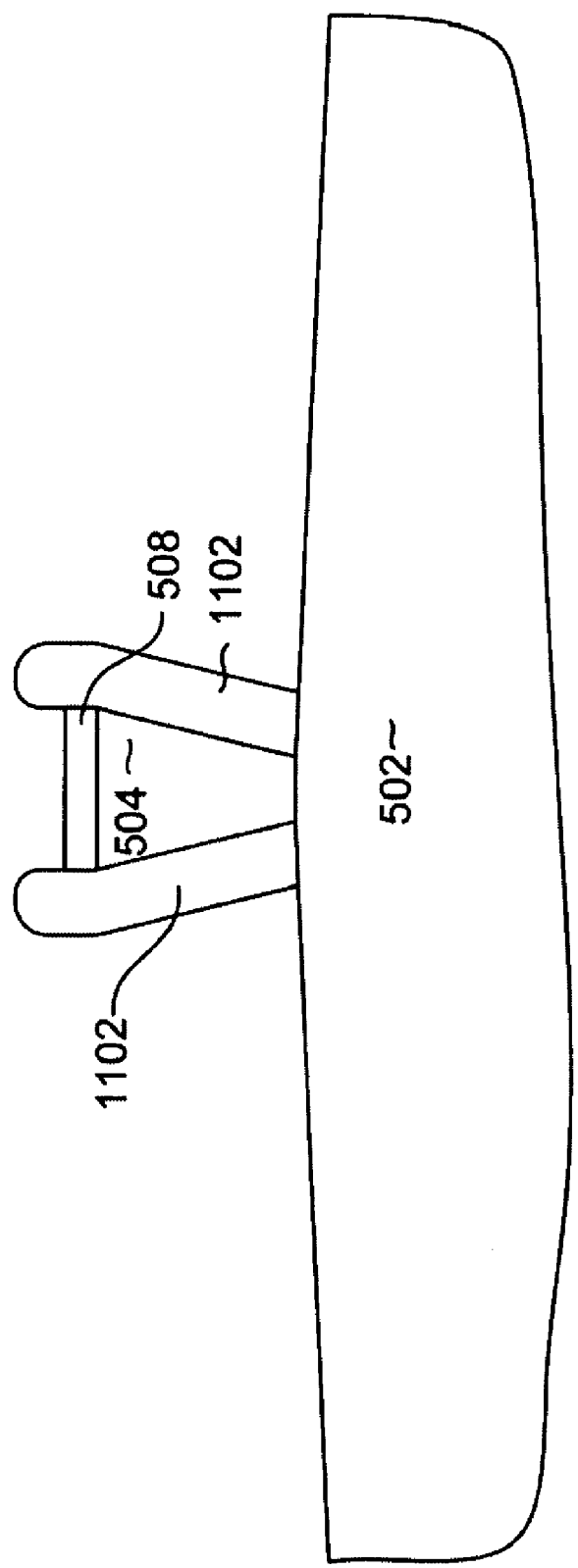
FIGS. 20-22 are views of a write head in various intermediate stages of manufacture illustrating a method of manufacturing a write head according to another possible embodiment of the invention.
Figure 21:
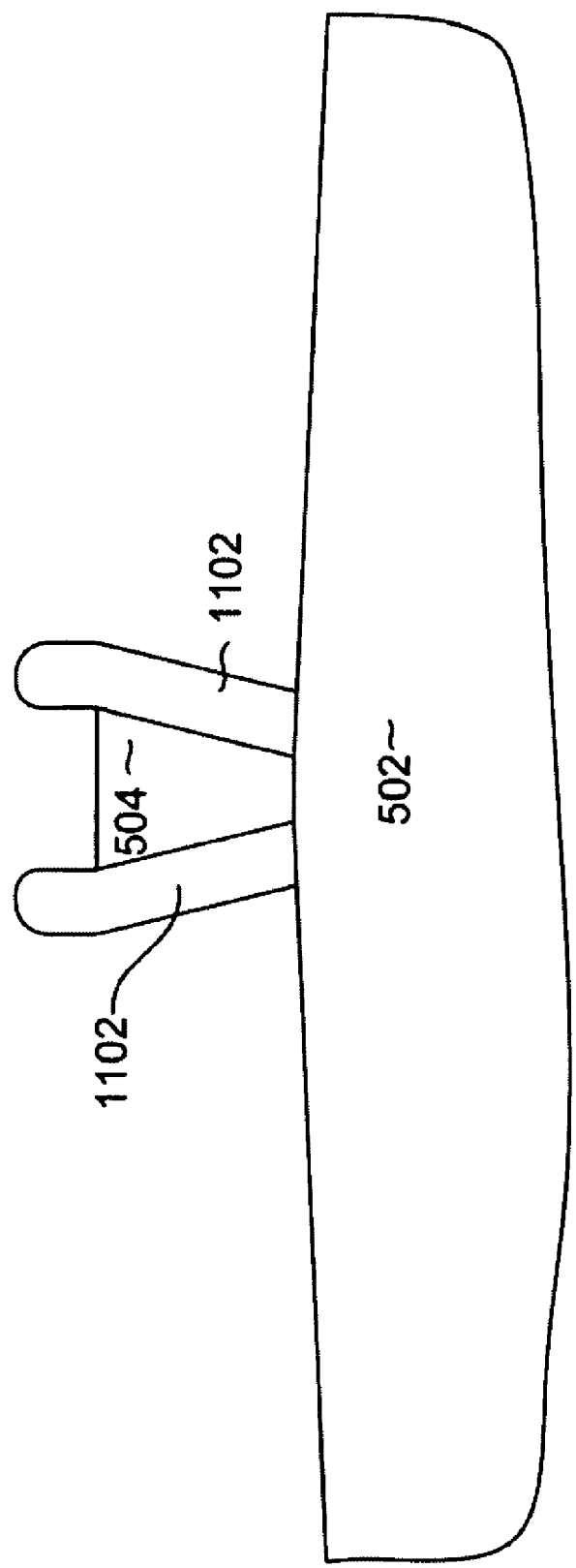
Figure 22:
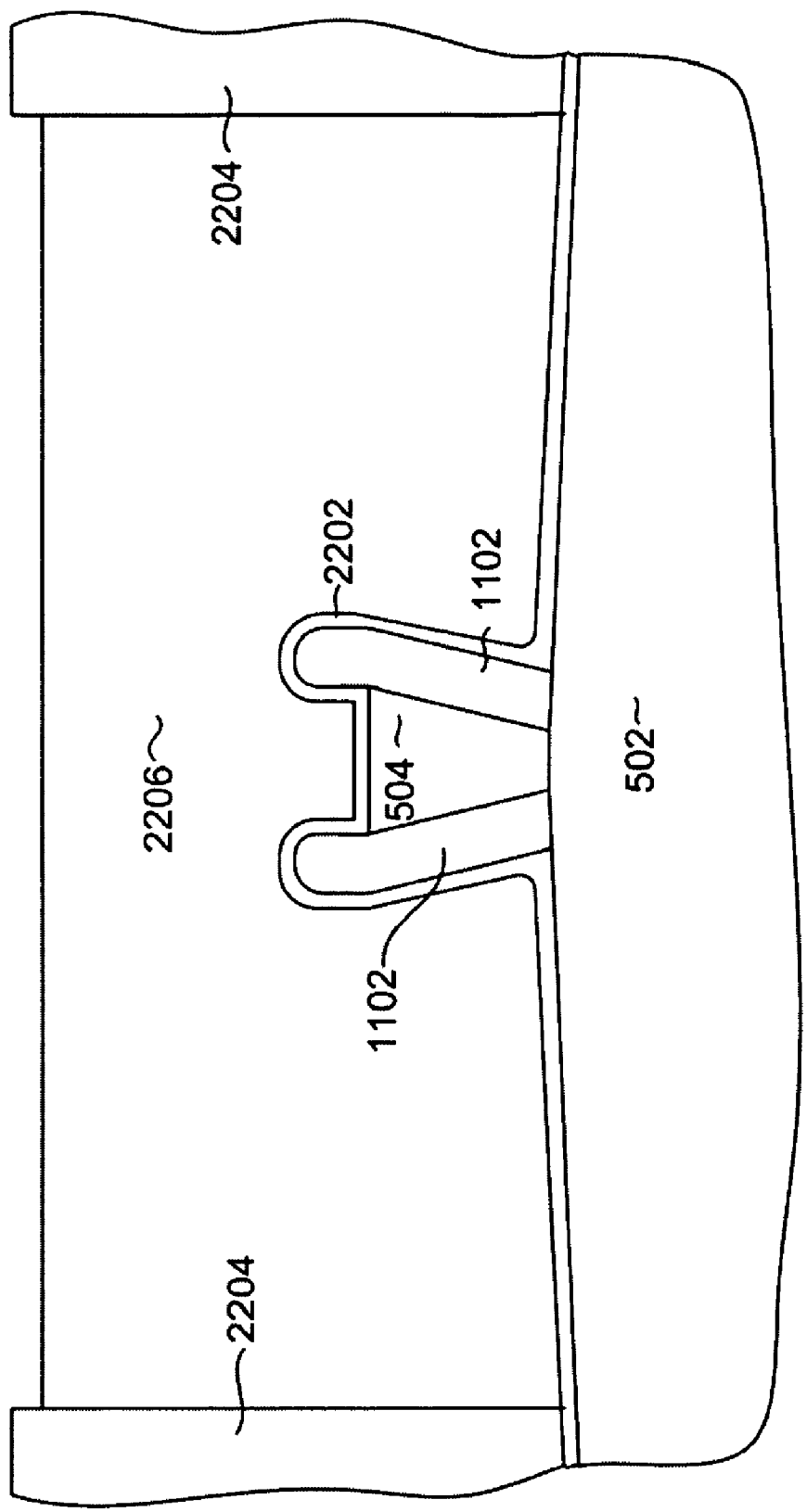

With reference now to FIGS. 20-22 an alternate method for manufacturing a write head when the write pole dimension is greater than 85 nm according to an embodiment of the invention is described. This includes forming a structure such as that described with reference to FIG. 11, and includes the steps described with reference to FIGS. 5-11, to form that structure. Then, an ion milling is performed in an Ar chemistry to preferentially remove horizontally disposed portions of the ALD, non-magnetic side gap layer 1102. This ion milling is terminated when the hard mask layer 508 has been reached, resulting in a structure such as shown in FIG. 20. An end point detection method such as secondary ion mass spectroscopy can be used to determine when the hard mask layer has been reached. Then, a reactive ion etching is performed to remove the remaining hard mask layer 508 leaving a structure such as that shown in FIG. 21. Then, with reference to FIG. 22, a non-magnetic, electrically conductive seed layer 2202 such as Rh is deposited to a thickness of a desired trailing gap, and a magnetic material is electroplated into a photoresist electroplating frame 2204 to form a wrap around trailing magnetic shield 2206.

Figure 23:
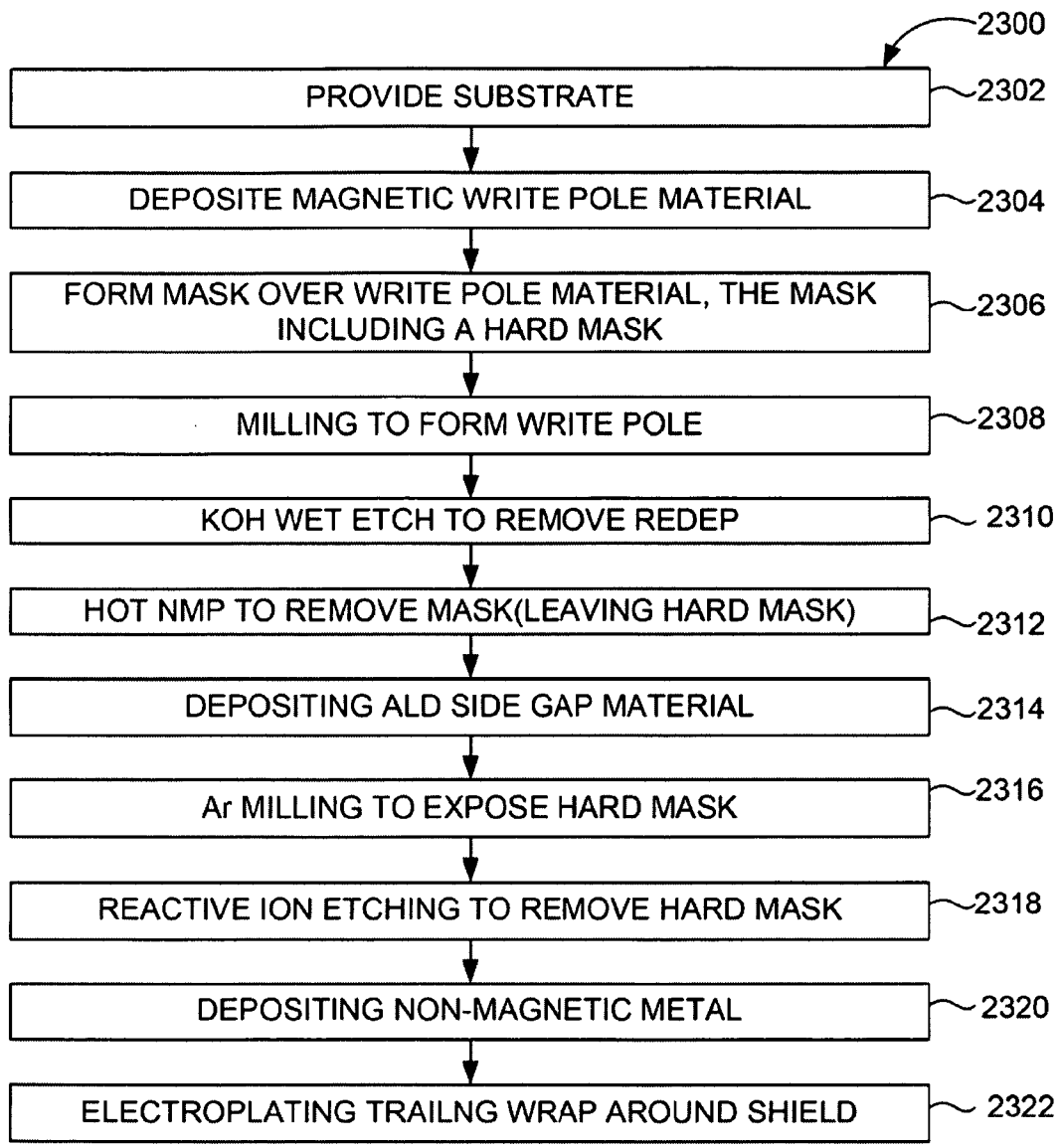
FIG. 23 is a flow chart illustrating a method for manufacturing a magnetic write head according to an alternate embodiment of the invention.
Figure 24:
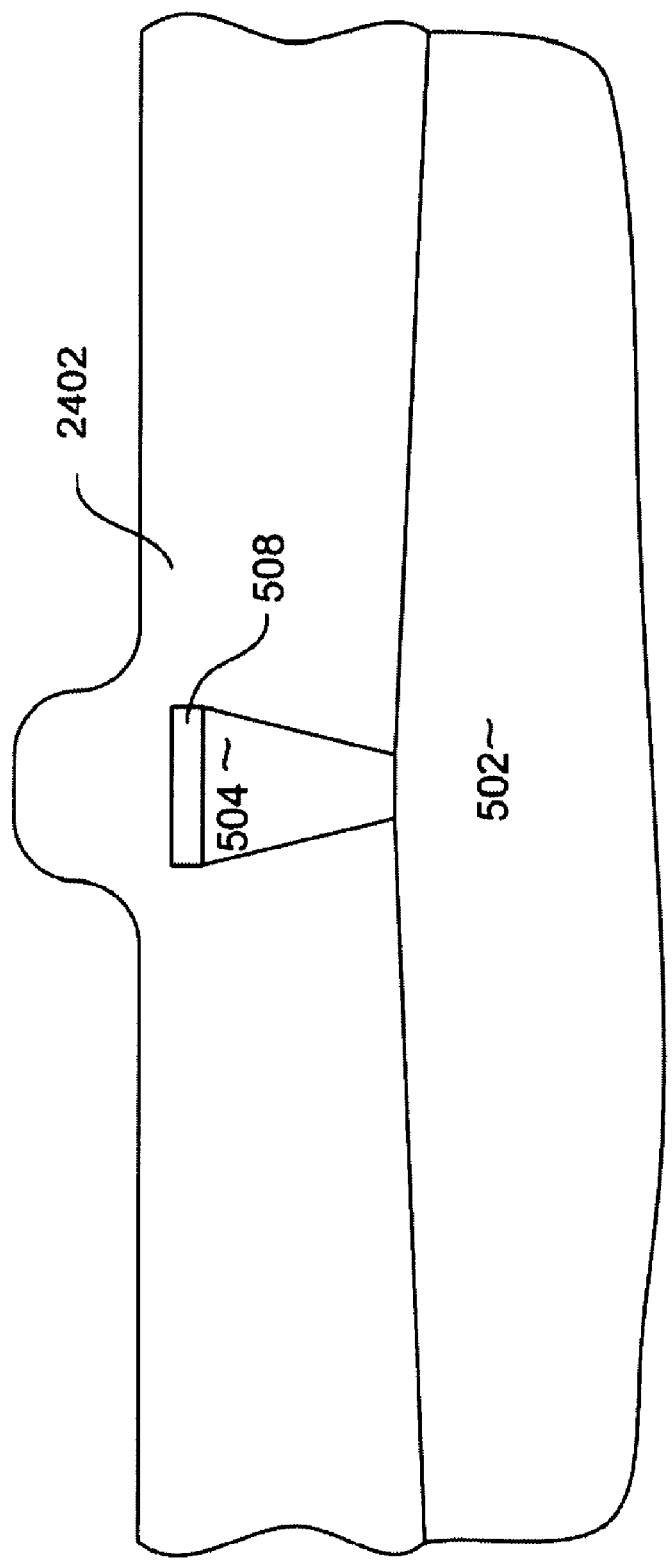
FIGS. 24-27 are views of a portion of a write head in various intermediate stages of manufacture, illustrating a method of manufacturing a write head according to another embodiment of the invention.
Figure 25:
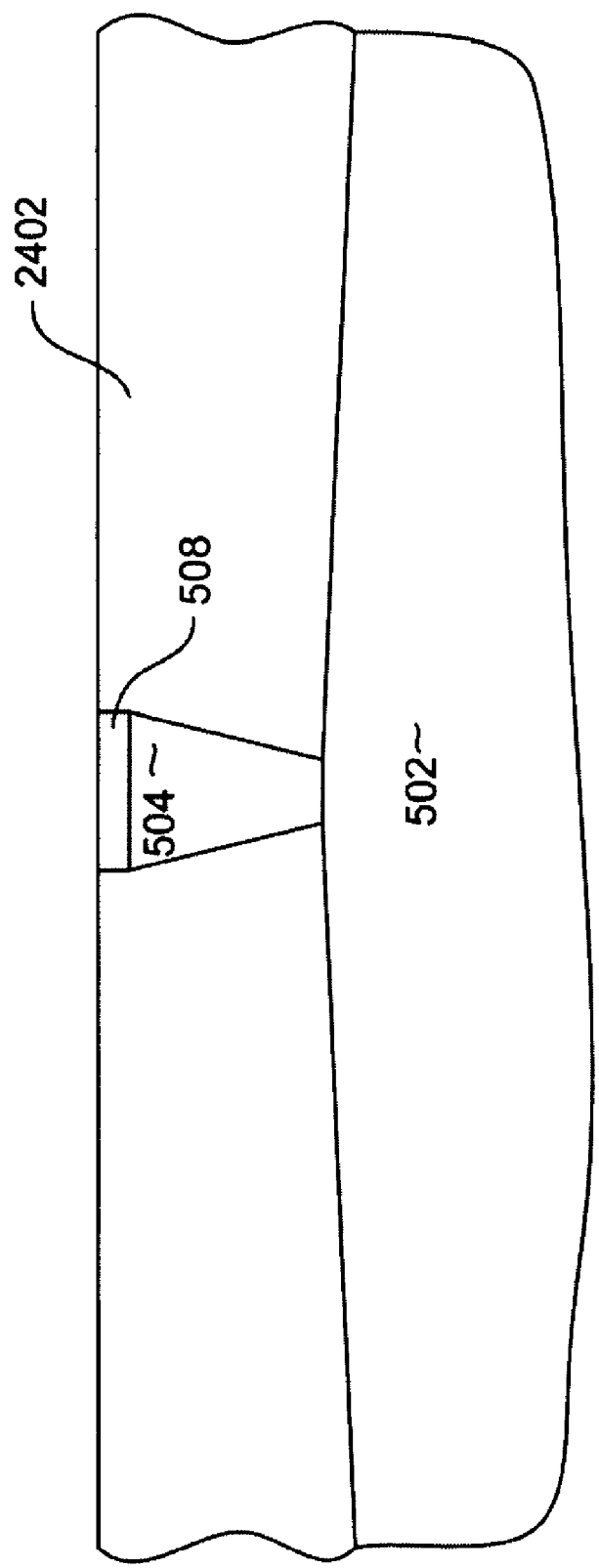

With reference now to FIG. 23, an alternate method 2300 for manufacturing a write head is summarized. In a step 2302 a substrate is provided, and in a step 2304 a magnetic write pole material is deposited over the substrate. Then, in a step 2306 a mask is formed over the magnetic write pole material, the mask being configured to define a write pole. Then, in a step 2308 an ion milling is performed to remove portions of the magnetic write pole material that are not covered by the mask layer in order to form a write pole. Then, in a step 2310 a KOH wet etch is performed to remove the redep, and in a step 2312 a hot NMP or similar process is performed to remove the remaining mask material, leaving the hard mask. Then, in a step a layer of alumina is deposited by a conformal method such as atomic layer deposition to form a non-magnetic side wall material. In a step 2316 an Ar ion milling is performed to preferentially remove horizontally disposed portions of the alumina, exposing the hard mask. Then, in a step 2318 a reactive ion etching is performed to remove the hard mask without damaging the write pole. A non-magnetic, electrically conductive seed layer is then deposited, in a step 2320 to a thickness to define a desired trailing gap, and, in a step 2322 a magnetic material is electroplated into a photoresist frame to form a trailing shield.

With reference now to FIGS. 24-27 a method is described for constructing a write pole having a trailing shield that does not wrap around a write head to form side shields. Such as method might be employed when side shielding is not desired, in order to simplify manufacture. The various processes are first performed as described above with reference to FIGS. 5-10 in order to form a write pole 504 having a hard mask 508 formed thereover. This includes removing re-dep and removing mask material as described above with reference Lo FIGS. 9 and 10.

Then, a thick layer of non-magnetic fill material such as alumina 2402 is deposited over the write pole 504 and substrate 502. The fill layer 2402 is preferably deposited to a thickness that is at least as high as the write pole 504. Then, with reference to FIG. 25, a chemical mechanical polishing CMP is performed to planarize the fill layer 2402, stopping at the hard mask layer 508 which acts as a CMP stop layer.

Figure 26:
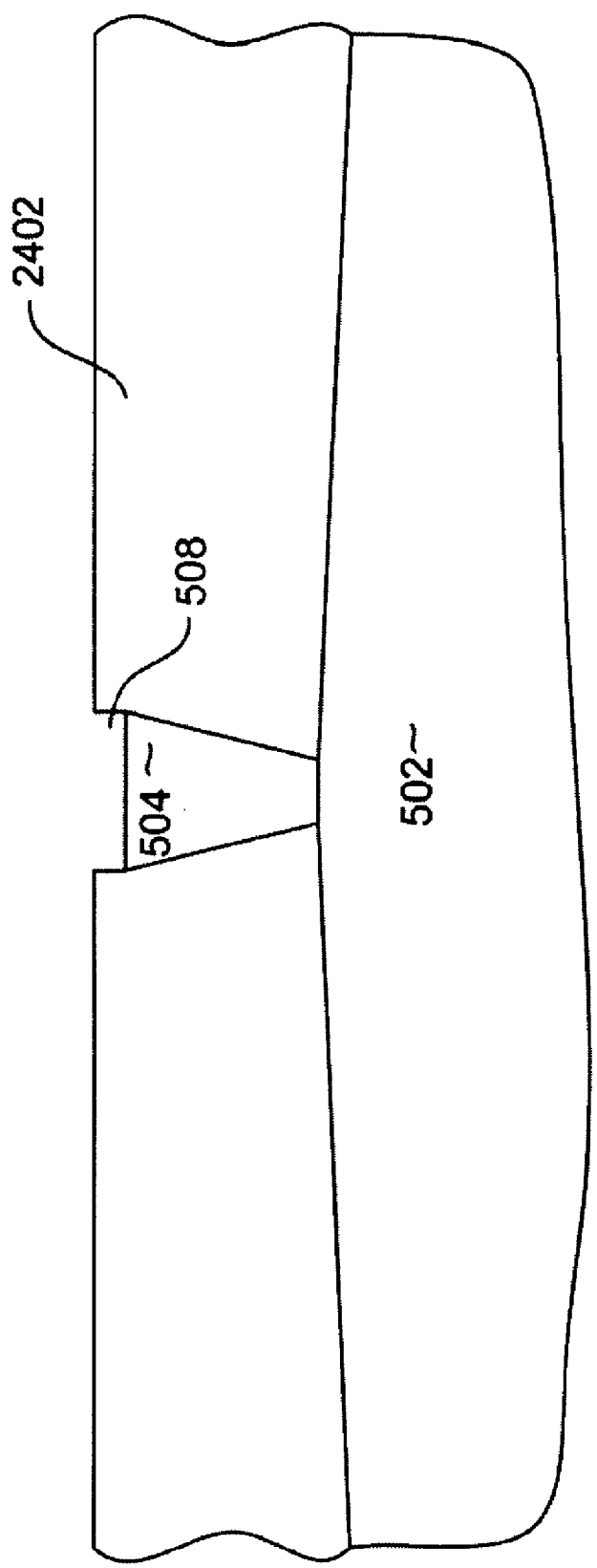
Figure 27:
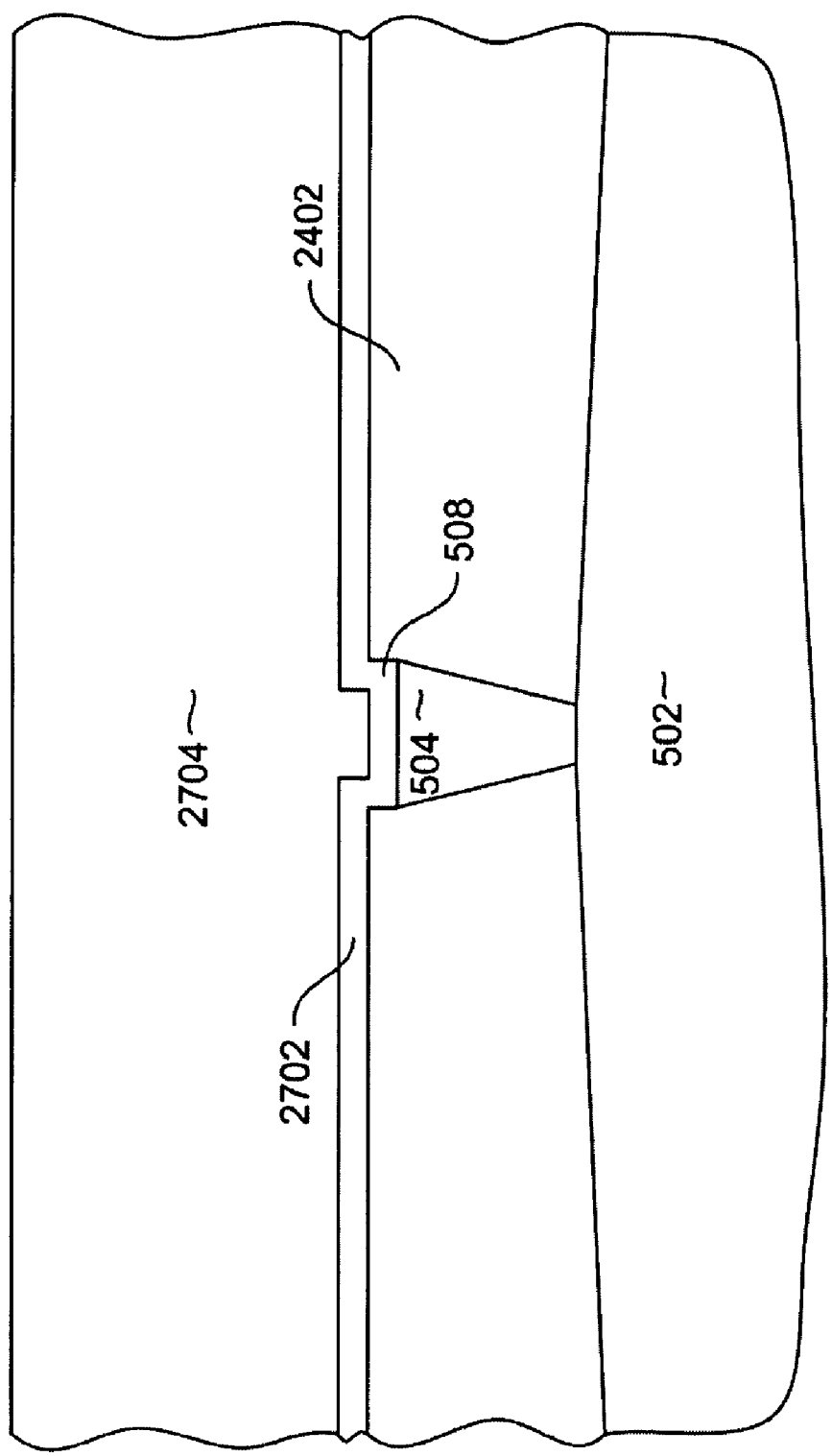

Then, a material removal process such as reactive ion etching (RIE) is performed to remove the hard mask layer 508 without damaging the write pole 504, leaving a structure such as that shown in FIG. 26. A non-magnetic, electrically conductive trailing gap layer 2702 is then deposited, and a magnetic material 2704 is electroplated, leaving a structure such as that shown in FIG. 27. The non-magnetic trailing gap material 2702 can be, for example, Rh or some other non-magnetic metal, and is deposited to a thickness to define a desired trailing gap. The layer 2702 also serves as a seed layer for electroplating the magnetic material 2704. It can be seen that the removal of the hard mask 508, forms a trailing shield 2704 with a notch at the write pole. The depth of this notch can be determined by the thickness of the hard mask 508.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head comprising:
   providing a substrate;
   depositing a magnetic write pole material over the substrate;
   depositing mask structure over the write pole material the mask including a hard mask contacting the magnetic write pole material and additional mask layers formed over the hard mask;
   performing a first ion milling to remove portions of the magnetic write pole material that are not protected by the mask structure to form a magnetic write pole having first and second sides;
   after performing the first ion milling, removing the additional mask layers, leaving the hard mask intact;
   after removing the portion of the hard mask structure formed over the hard mask, depositing a non-magnetic side gap material;
   after depositing the non-magnetic side gap material, performing a second ion milling sufficiently to form the non-magnetic side gap material into first and second non-magnetic sides walls, formed at the first and second sides of the write pole, each of the first and second non-magnetic side walls having an outer edge opposite the write pole, the second ion milling being performed sufficiently to form a recess in the substrate, the recess initiating at the outer edge of each of the first and second non-magnetic side gaps;

depositing a fill layer;

performing a chemical mechanical polishing sufficiently to expose the hard mask;

removing the fill layer;

performing a reactive ion etching to remove the hard mask depositing a non-magnetic, electrically conductive seed layer; and electroplating a magnetic material over the non-magnetic, electrically conductive seed layer to form a trailing, wrap-around magnetic shield.

2. A method as in claim 1 wherein the depositing a non-magnetic side gap layer comprises depositing alumina by atomic layer deposition.

3. A method as in claim 1 wherein the depositing a non-magnetic side gap layer comprises depositing alumina by chemical vapor deposition.

4. A method as in claim 1 wherein the fill layer comprises $SiO_2$ or SiON.

5. A method as in claim 1, wherein the first ion milling results in re-deposited material being formed on the sides of the mask structure, the method further comprising, after performing the first ion milling and before removing the portion of the mask structure formed over the hard mask, performing a KOH wet etch.

6. A method as in claim 1 wherein the removing the portion of the mask structure formed over the hard mask comprises using a hot n-methyl-pyrrolidone (NMP).

7. A method as in claim 1 wherein the fill layer comprises $SiO_2$ deposited by ion beam deposition.

8. A method for manufacturing a magnetic write head comprising:

providing a substrate;

depositing a magnetic write pole material over the substrate;

depositing mask structure over the write pole material the mask including a hard mask contacting the magnetic write pole material and additional mask layers formed over the hard mask;

performing a first ion milling to remove portions of the magnetic write pole material that are not protected by the mask structure to form a write pole having first and second sides;

after performing the first ion milling, removing the additional mask layers, leaving the hard mask intact;

depositing a non-magnetic side gap material;

after depositing the non-magnetic side gap material, performing a second ion milling sufficiently to expose the hard mask, and sufficiently to form the non-magnetic side gap material into first and second side walls formed at the first and second sides of the write pole, the non-magnetic side walls each having an outer edge opposite the write pole, the second ion milling being performed sufficiently to form a recess in the substrate, the recess initiating at the outer edge of each of the first and second side walls;

performing a reactive ion etching to remove the hard mask;

depositing an electrically conductive, non-magnetic seed layer; and electroplating a magnetic material to form a trailing magnetic shield.

9. A method as in claim 8 wherein the second ion milling is an Ar ion milling.

10. A method as in claim 8 wherein the removing a portion of the mask layer comprises performing a hot n-methyl-pyrrolidone (NMP).

11. A method as in claim 8 wherein the first ion milling results in redeposited material being deposited onto the mask structure, the method further comprising, after performing the first ion milling, removing the redeposited material.

12. A method as in claim 8 further comprising after performing the first ion milling, performing a KOH wet etch.

13. A method as in claim 8 further wherein the depositing a non-magnetic side gap material comprises depositing alumina.

14. A method as in claim 8 further wherein the depositing a non-magnetic side gap material comprises depositing alumina by atomic layer deposition.

15. A method as in claim 8 further comprising employing an end point detection method to determine when the second ion milling has reached the hard mask layer, and terminating the second ion milling when the hard mask layer has been reached.

16. A method as in claim 8 further comprising employing a secondary ion mass spectroscopy to determine when the second ion milling has reached the hard mask layer, and terminating the second ion milling when the hard mask layer has been reached.

* * * * *